(12) United States Patent
Fiorucci et al.

(10) Patent No.: US 10,867,312 B2
(45) Date of Patent: *Dec. 15, 2020

(54) CITY PARKING SERVICES WITH AREA BASED LOYALTY PROGRAMS

(71) Applicant: Mentis Services France, Nice (FR)

(72) Inventors: Jean-Louis Fiorucci, Nice (FR); Richard E. Rowe, Las Vegas, NV (US)

(73) Assignee: Mentis Services France, Nice (FR)

( * ) Notice: Subject to any disclaimer, the term of this patent is extended or adjusted under 35 U.S.C. 154(b) by 241 days.

This patent is subject to a terminal disclaimer.

(21) Appl. No.: 15/806,082

(22) Filed: Nov. 7, 2017

(65) Prior Publication Data
US 2018/0068337 A1     Mar. 8, 2018

Related U.S. Application Data

(63) Continuation of application No. 14/534,976, filed on Nov. 6, 2014, now Pat. No. 9,842,346, which is a (Continued)

(51) Int. Cl.
*G06Q 30/02* (2012.01)
*H04W 4/80* (2018.01)
(Continued)

(52) U.S. Cl.
CPC ....... *G06Q 30/0207* (2013.01); *G06Q 20/047* (2020.05); *G06Q 20/0457* (2013.01);
(Continued)

(58) Field of Classification Search
CPC ............... G06Q 30/00; G06Q 30/0284; G06Q 30/0207; G06Q 30/0226; G06Q 30/0235;
(Continued)

(56) References Cited

U.S. PATENT DOCUMENTS 5,710,743 A  1/1998 Dee et al.
6,266,609 B1  7/2001 Fastenrath
(Continued)

FOREIGN PATENT DOCUMENTS

EP  0965962 B1  10/2009
JP  066243396 A  9/1994
(Continued)

OTHER PUBLICATIONS

"Roncari Express Valet Parking—STARcard Program/Program Information", Internet Archive: http://roncarivalet.com/STARcard.aspx. Jan. 22, 2009. pp. 1-2. (Year: 2009).*
(Continued)

*Primary Examiner* — William A Brandenburg
(74) *Attorney, Agent, or Firm* — Kwan & Olynick LLP

(57) ABSTRACT

Apparatus and methods related providing city services, such as parking, are described. Methods and apparatus for providing parking rewards programs are described. The methods and apparatus can include maintaining accounts for participants in the rewards program, tracking purchases of parking and other participant activities and determining parking awards based upon the activities. The parking rewards programs can be used to incentivize behaviors that balance the use of the parking space commodity according to the needs of different stakeholders, such as the city, residents, merchants and visitors. For example, parking awards and the criteria used for earning awards can be used to encourage particular behaviors while a parking space is being utilized, such as shopping, the use of public transportation or efficient trip planning.

21 Claims, 6 Drawing Sheets

Related U.S. Application Data continuation of application No. 13/180,288, filed on Jul. 11, 2011, now abandoned, application No. 15/806,082, which is a continuation-in-part of application No. 15/659,542, filed on Jul. 25, 2017, now Pat. No. 10,462,621, which is a continuation of application No. 12/763,077, filed on Apr. 19, 2010, now Pat. No. 9,749,823, which is a continuation-in-part of application No. PCT/US2010/020799, filed on Jan. 12, 2010.

(60) Provisional application No. 61/285,860, filed on Dec. 11, 2009, provisional application No. 61/320,237, filed on Apr. 1, 2010.

(51) Int. Cl.

| | | |
|---|---|---|
| H04W 4/42 | (2018.01) | |
| G07F 17/24 | (2006.01) | |
| G06Q 20/04 | (2012.01) | |
| G06Q 20/12 | (2012.01) | |
| G06Q 20/32 | (2012.01) | |
| G06Q 20/38 | (2012.01) | |
| G06Q 20/40 | (2012.01) | |
| G08G 1/005 | (2006.01) | |
| G08G 1/127 | (2006.01) | |
| G08G 1/133 | (2006.01) | |
| G08G 1/14 | (2006.01) | |
| G08G 1/00 | (2006.01) | |
| G07B 15/02 | (2011.01) | |
| H04W 4/38 | (2018.01) | |
| H04W 4/024 | (2018.01) | |
| H04W 4/18 | (2009.01) | |
| H04W 4/44 | (2018.01) | |

(52) U.S. Cl.
CPC ....... *G06Q 20/127* (2013.01); *G06Q 20/3224* (2013.01); *G06Q 20/387* (2013.01); *G06Q 20/405* (2013.01); *G06Q 30/0205* (2013.01); *G06Q 30/0226* (2013.01); *G06Q 30/0234* (2013.01); *G06Q 30/0235* (2013.01); *G07B 15/02* (2013.01); *G07F 17/242* (2013.01); *G07F 17/246* (2013.01); *G08G 1/005* (2013.01); *G08G 1/127* (2013.01); *G08G 1/133* (2013.01); *G08G 1/144* (2013.01); *G08G 1/147* (2013.01); *G08G 1/202* (2013.01); *H04W 4/42* (2018.02); *H04W 4/80* (2018.02); *H04W 4/024* (2018.02); *H04W 4/18* (2013.01); *H04W 4/38* (2018.02); *H04W 4/44* (2018.02)

(58) Field of Classification Search
CPC ........... G06Q 30/0234; G06Q 30/0205; G06Q 20/047; G06Q 20/387; G06Q 20/127; G08G 1/147; G07F 17/242; G07B 15/02; H04W 4/44
See application file for complete search history.

(56) References Cited

U.S. PATENT DOCUMENTS

| | | |
|---|---|---|
| 6,386,450 B1 | 5/2002 | Ogasawara |
| 6,411,937 B1 | 6/2002 | Brusseaux |
| 6,587,835 B1 | 7/2003 | Treyz et al. |
| 6,647,269 B2 | 11/2003 | Hendrey et al. |
| 6,690,286 B2 | 2/2004 | Polyakov |
| 6,885,311 B2 | 4/2005 | Howard et al. |
| 7,014,355 B2 | 3/2006 | Potter, Sr. et al. |
| 7,188,154 B2 | 3/2007 | Minowa |
| 7,224,274 B2 | 5/2007 | Silverbrook |
| 7,309,009 B2 | 12/2007 | Singer-harter |
| 7,342,510 B2 | 3/2008 | Pate |
| 7,466,241 B2 | 12/2008 | Lyle et al. |
| 7,533,128 B1 | 5/2009 | Sanchez et al. |
| 8,330,624 B2 | 12/2012 | Groft et al. |
| 8,423,431 B1 | 4/2013 | Rouaix et al. |
| 8,489,112 B2 | 7/2013 | Roeding et al. |
| 8,600,800 B2 | 12/2013 | Rowe et al. |
| 8,688,509 B2 | 4/2014 | Rowe et al. |
| 8,831,971 B2 | 9/2014 | Rowe et al. |
| 9,159,080 B2 | 10/2015 | Fiorucci et al. |
| 9,749,823 B2 | 8/2017 | Rowe et al. |
| 9,842,346 B2 | 12/2017 | Fiorucci et al. |
| 2002/0007306 A1 | 1/2002 | Granger et al. |
| 2002/0008639 A1 | 1/2002 | Dee |
| 2002/0084917 A1 | 7/2002 | Hauptman et al. |
| 2002/0085515 A1 | 7/2002 | Jaynes et al. |
| 2002/0087401 A1 | 7/2002 | Leapman et al. |
| 2002/0099574 A1 | 7/2002 | Cahill et al. |
| 2002/0109610 A1 | 8/2002 | Katz |
| 2003/0014315 A1 | 1/2003 | Jaalinoja et al. |
| 2004/0181496 A1 | 9/2004 | Odinotski et al. |
| 2004/0226993 A1 | 11/2004 | Fulcher et al. |
| 2004/0252034 A1 | 12/2004 | Slemmer et al. |
| 2004/0254840 A1 | 12/2004 | Slemmer et al. |
| 2004/0260605 A1 | 12/2004 | McIntyre et al. |
| 2005/0168352 A1 | 8/2005 | Tomer |
| 2005/0228583 A1 | 10/2005 | Capuano |
| 2005/0229451 A1 | 10/2005 | Mullens |
| 2005/0258632 A1 | 11/2005 | Currier |
| 2005/0280555 A1 | 12/2005 | Warner, IV |
| 2006/0010046 A1 | 1/2006 | Van Zandt |
| 2006/0072010 A1 | 4/2006 | Haering et al. |
| 2006/0095344 A1 | 5/2006 | Nakfoor |
| 2006/0116972 A1 | 6/2006 | Wong |
| 2006/0143080 A1 | 6/2006 | Garg et al. |
| 2006/0170566 A1 | 8/2006 | Slemmer et al. |
| 2006/0212344 A1 | 9/2006 | Marcus et al. |
| 2006/0250278 A1 | 11/2006 | Tillotson et al. |
| 2006/0260166 A1 | 11/2006 | Pate |
| 2006/0267799 A1 | 11/2006 | Mendelson |
| 2006/0283941 A1 | 12/2006 | Singer-Harter |
| 2007/0001904 A1 | 1/2007 | Mendelson |
| 2007/0050248 A1 | 3/2007 | Huang et al. |
| 2007/0129974 A1 | 6/2007 | Chen et al. |
| 2007/0257818 A1 | 11/2007 | Aubrey et al. |
| 2007/0267479 A1* | 11/2007 | Nix ............. G06Q 20/10 235/379 |
| 2007/0290888 A1 | 12/2007 | Reif et al. |
| 2008/0030373 A1 | 2/2008 | Montgomery |
| 2008/0033824 A1 | 2/2008 | Pakers, Jr. et al. |
| 2008/0136674 A1 | 6/2008 | Jang et al. |
| 2008/0291054 A1 | 11/2008 | Groft |
| 2008/0308628 A1 | 12/2008 | Payne et al. |
| 2009/0067846 A1 | 3/2009 | Yu et al. |
| 2009/0077100 A1 | 3/2009 | Hancock et al. |
| 2009/0099910 A1 | 4/2009 | Merkin et al. |
| 2009/0204319 A1 | 8/2009 | Shanbhag et al. |
| 2009/0276300 A1 | 11/2009 | Shaw et al. |
| 2009/0313104 A1 | 12/2009 | Hafner et al. |
| 2010/0029268 A1 | 2/2010 | Myer et al. |
| 2010/0064025 A1 | 3/2010 | Nelimarkka et al. |
| 2010/0070365 A1 | 3/2010 | Siotia et al. |
| 2010/0191584 A1 | 7/2010 | Fraser et al. |
| 2010/0282836 A1 | 11/2010 | Kempf et al. |
| 2011/0004507 A1* | 1/2011 | Potkonjak ....... G06Q 30/0261 705/7.37 |
| 2011/0015934 A1* | 1/2011 | Rowe ............. G06Q 50/30 705/1.1 |
| 2011/0060653 A1* | 3/2011 | King ............. G06Q 30/0261 705/14.58 |
| 2011/0082746 A1 | 4/2011 | Rice et al. |
| 2011/0295923 A1 | 12/2011 | De Campos Ruiz et al. |
| 2011/0320259 A1 | 12/2011 | Roumeliotis et al. |
| 2012/0092190 A1 | 4/2012 | Stefik et al. |
| 2012/0095791 A1* | 4/2012 | Stefik ............. G08B 25/12 705/5 |

(56) References Cited

U.S. PATENT DOCUMENTS

| | | | |
|---|---|---|---|
| 2012/0245981 A1* | 9/2012 | Volz | G07B 15/02 |
| | | | 705/13 |
| 2013/0103460 A1 | 4/2013 | Groft et al. | |
| 2014/0207540 A1 | 7/2014 | Rowe et al. | |
| 2014/0337135 A1 | 11/2014 | Rowe et al. | |
| 2015/0066607 A1 | 3/2015 | Fiorucci et al. | |
| 2015/0294431 A1 | 10/2015 | Fiorucci et al. | |
| 2017/0325082 A1 | 11/2017 | Rowe et al. | |

FOREIGN PATENT DOCUMENTS

| | | |
|---|---|---|
| JP | 2000123209 A | 4/2000 |
| JP | 201055583 A | 3/2010 |
| KR | 1020070091704 | 9/2007 |
| KR | 100778618 | 11/2007 |
| KR | 1020080100128 | 11/2008 |
| KR | 1020090039350 A | 4/2009 |
| WO | WO00/75876 A | 12/2000 |
| WO | 1020070092548 | 9/2007 |
| WO | 2008140438 A1 | 11/2008 |
| WO | 2009027839 A2 | 3/2009 |
| WO | 2009154787 A2 | 12/2009 |
| WO | 2014066429 A1 | 5/2014 |

OTHER PUBLICATIONS

"Smart Cards and Parking—A Smart Card Alliance Transportation Council White Paper", by Smart Card Alliance. Published Jan. 2006, Publication # TC-06001. (Year: 2006).*
"U.S. Appl. No. 12/763,077, Appeal Brief Filed Apr. 21, 2014", 37 pgs.
"U.S. Appl. No. 12/763,077, Final Office Action dated Apr. 17, 2015", 16 pgs.
"U.S. Appl. No. 12/763,077, Final Office Action dated Oct. 18, 2013", 16 pgs.
"U.S. Appl. No. 12/763,077, Non Final Office Action dated Jul. 14, 2016", 15 pgs.
"U.S. Appl. No. 12/763,077, Non-Final Office Action dated Aug. 14, 2014", 16 pgs.
"U.S. Appl. No. 12/763,077, Notice of Allowance dated May 5, 2017", 8 pgs.
"U.S. Appl. No. 12/876,382, Notice of Allowance dated Sep. 11, 2013", 19 pgs.
"U.S. Appl. No. 13/180,288, Examiner Interview Summary dated Nov. 27, 2013", 3 pgs.
"U.S. Appl. No. 13/180,288, Final Office Action dated Mar. 20, 2014", 49 pgs.
"U.S. Appl. No. 13/180,288, Non Final Office Action dated Jul. 30, 2013", 64 pgs.
"U.S. Appl. No. 13/183,242, Notice of Allowance dated Nov. 22, 2013", 23 pgs.
"U.S. Appl. No. 13/370,169, Examiner Interview Summary dated Mar. 13, 2014", 3 pgs.
"U.S. Appl. No. 13/370,169, Examiner Interview Summary dated Jul. 2, 2013", 6 pgs.
"U.S. Appl. No. 13/370,169, Final Office Action dated Mar. 27, 2015", 6 pgs.
"U.S. Appl. No. 13/370,169, Final Office Action dated Nov. 7, 2013", 14 pgs.
"U.S. Appl. No. 13/370,169, Non Final Office Action dated Apr. 17, 2013", 12 pgs.
"U.S. Appl. No. 13/370,169, Non Final Office Action dated Sep. 24, 2014", 19 pgs.
"U.S. Appl. No. 13/370,169, Notice of Allowance dated Jun. 5, 2015", 16 pgs.
"U.S. Appl. No. 14/534,976, Advisory Action dated Jul. 20, 2017", 3 pgs.
"U.S. Appl. No. 14/534,976, Final Office Action dated Jun. 2, 2017", 13 pgs.
"U.S. Appl. No. 14/534,976, Non Final Office Action dated Sep. 29, 2016", 24 pages.
"U.S. Appl. No. 14/534,976, Notice of Allowance dated Aug. 8, 2017", 15 pgs.
"European Application Serial No. 10836332.6, European Search Report dated Feb. 23, 2017", 12 pgs.
"European Application Serial No. 12175949.2, Office Action dated Jan. 7, 2015", 5 pgs.
"European Application Serial No. 14775573.0, Office Action dated Mar. 1, 2017", 6 pgs.
"Extended Search Report dated Jan. 7, 2013 from European Application No. 12175949.2", Jan. 7, 2013, 7 pgs.
"Int'l Application Serial No. PCT/US2013/066245, Preliminary Report on Patentability dated May 7, 2015", 7 pgs.
"Int'l Application Serial No. PCT/US2013/066245, Search Report & Written Opinion dated Jan. 21, 2014", 10 pgs.
"Notice From the European Paten Office dated Oct. 1, 2007 Concerning Business Methods", Official Journal of the European Patent Office, vol. 30, No. 11, XP007905525, Oct. 1, 2007, 592-593.
"Thanks Again Launches Customer Loyalty Program for Tulsa International Airport", PR Web; Retrieved from Internet <thanksagain.com/thanks-again-launches-customer-loyalty-program-for-tulsa-international-airport/>, Mar. 3, 2011, pp. 1-2.
"U.S. Final Office Action dated Nov. 8, 2012 in U.S. Appl. No. 12/876,382", Nov. 8, 2012, 16 pgs.
"U.S. Office Action dated Feb. 9, 2012 in U.S. Appl. No. 12/763,077", Feb. 9, 2012, 19 pgs.
"U.S. Office Action dated Jan. 24, 2013 from U.S. Appl. No. 13/183,242", Jan. 24, 2013, 31 pgs.
"U.S. Office Action dated Dec. 28, 2012 in U.S. Appl. No. 12/876,382", Dec. 28, 2012, 21 pgs.
"U.S. Office Action dated Mar. 28, 2012 in U.S. Appl. No. 13/183,242", Mar. 28, 2012, 23 pgs.
Rehrl, Karl et al., "Assisting Multimodal Travelers: Design and Prototypical Implementation of a Personal Travel Companion", IEEE Transactions on Intelligent Transportation Systems, IEEE, Piscataway, NJ, USA, vol. 8, No. 1, XP011171954, ISSN: 1524-9050, DOI: 1 0.1109/TITS.2006.890077, Mar. 1, 2007, 31-42.
Whitworth, Damian , "Park Life", The Times, London, United Kingdom,, Apr. 20, 2007.
"U.S. Appl. No. 14/178,186, Notice of Allowance dated May 7, 2014", 14 pgs.
"U.S. Appl. No. 15/659,542, Non Final Office Action dated Feb. 7, 2019", 6 pgs.
"U.S. Appl. No. 15/659,542, Notice of Allowance dated Jun. 19, 2019", 9 pages.

* cited by examiner

CITY PARKING SERVICES WITH AREA BASED LOYALTY PROGRAMS

CROSS REFERENCE TO RELATED APPLICATIONS

This application claims priority under 35 U.S.C. § 120 and is continuation of U.S. patent application Ser. No. 14/534,976, by Rowe et al., filed Nov. 6, 2014, which claims priority wider 35 U.S.C. § 120 and is continuation of U.S. patent application Ser. No. 13/180,288, filed Jul. 11, 2011, by Rowe et al, each of which is incorporated by reference and for all purposes. This application claims priority under 35 U.S.C. § 120 and is continuation-in-part of co-pending U.S. patent application Ser. No. 15/659,542, filed Jul. 25, 2017, by Rowe, et al., which claims priority under 35 U.S.C. § 120 and is continuation of U.S. patent application Ser. No. 12/763,077, filed Apr. 19, 2010, by Rowe, et al., issued as U.S. Pat. No. 9,749,823 on Aug. 29, 2017, which claims priority wider 35 U.S.C. § 120 and is continuation-in-part of PCT/US2010/020799, titled "Providing City Services Using Mobile Devices And A Sensor Network," filed Jan. 12, 2010 by Fiorucci et al., which claimed priority under 35 U.S.C. § 119(e) from U.S. Provisional Patent Application No. 61/285,860, filed Dec. 11, 2009, titled "Providing City Services Using Mobile Devices And A Sensor Network" and U.S. patent application Ser. No. 12/763,077 further claims priority under 35 U.S.C. § 119(e) from U.S. Provisional Patent Application No. 61/320,237, filed Apr. 1, 2010, titled "Providing City Services Using Mobile Devices And A Sensor Network," each of which is incorporated by reference and for all purpose.

FIELD OF THE INVENTION

The described embodiments relate generally to systems for providing services in a city environment. More particularly, the present embodiments relate to methods and apparatus for providing transportation and parking services in a city environment.

DESCRIPTION OF THE RELATED ART

A large variety of services are provided in cities. These services can be provided by public entities, such as local and national government agencies, as well as private entities, such as local merchants. Examples of public services include transportation and health related services. Examples of private services include providing items, such as food, clothing, fuel and entertainment. A key factor in obtaining these services is finding parking. It has been estimated that drivers looking for parking account for as much 40% of the congestion associated with city driving.

On city streets, parking spaces are a shared and limited commodity. It is valuable to residents, merchants, visitors and city governments, which use it as a revenue source. To allocate this commodity, cities develop and enforce complicated parking policies that attempt to balance the needs of residents, visitors, merchants and the desire of city governments to generate revenues. The policies can dictate parameters, such as parking rates and a length of time that a parking space can be utilized where the rate and length of time varies from location to location within the city. Further, the policies can dictate penalties, such as tines, when a local parking policy associated with a particular space is violated.

A city's parking policies are designed to encourage certain parking behaviors in regards to utilization of parking spaces that balance the needs of merchants, residents, visitors and the city's desire to generate revenue and alleviate congestion. One disadvantage of the parking policies is that they are static and not easily adjusting to changing conditions, such as the availability of parking in a particular area at a particular time or the needs of a particular individual at a particular time. Another disadvantage of the parking policies is that only penalties are provided to discourage certain parking behaviors. The negative incentives and their enforcement are a common complaint for individuals that live, work and visit a typical large city.

In view of the above, methods of implementing parking policies are desired that are dynamically adjustable and reward users for parking behaviors that encourage efficient use of city parking resources.

SUMMARY OF THE DESCRIBED EMBODIMENTS

This paper describes various embodiments that relate: to systems, methods, and apparatus for providing city services, such as parking and transportation services. A mobile device can be configured to receive information from sensor nodes, such as parking sensor nodes, in the vicinity of the mobile device. In a parking application, the mobile device located in a moving vehicle can be configured to locate available parking based upon the information received from the parking sensor nodes. After an available parking space is obtained, the mobile device can be configured to initiate a purchase of parking and receive information related to parking enforcement from a remote server.

One aspect of can involve a server including a processor, a memory and a network interface. The server can be configured to execute computer code for 1) generating a parking rewards account for a participant in parking rewards program; 2) receiving, via the network interface, an indication of a purchase of parking associated with the parking rewards account wherein the indication includes a purchase amount and a time period for the purchase of parking; 3) receiving, via the network interface, an indication of an activity including information about the activity and a time activity occurred; 4) determining the activity occurred within the time period for the purchase of parking; 5) when the activity is determined to have occurred during the time period for the purchase of parking, determining an amount of award points earned for the activity; and 6) storing to the memory information associated with the purchase of parking including the time period, information about the activity that occurred during the time period for the purchase of parking and the amount of award points earned for the activity to the memory wherein the award points are redeemable for parking awards.

A mobile device can be generally characterized as comprising, a processor, a memory coupled to the processor, a display, an input mechanism, a first communication interface configured for communication with a cellular network or a wireless data network, a second communication interface configured to receive information related to available parking broadcast from one or more local sensor nodes in communication range of the mobile device, the information including a location of the available parking. The processor can be configured to 1) determine a current location of the mobile device; 2) output a map to the display, said map including streets, the location of the mobile device and the location of the available parking; 3) receive a request to initiate a transaction to purchase parking via the input mechanism, 4) generate the transaction to purchase the parking via one or more communications with a remote device; and 5) receive an electronic receipt from the remote device indicating the parking is purchased.

A sensor node can be generally characterized as comprising a processor, a memory coupled to the processor, a communication interface, and one or more sensors for detecting objects in an area where vehicles are parked. The processor can be configured to 1) receive data from the one or more sensors, 2) to determine, based upon the data, whether there is an unoccupied space in the area that can be utilized for parking of a vehicle; 3) to broadcast information relating to the unoccupied space including location information associated with the unoccupied space, 4) control a first time interval associated with how often the determination of whether there is the unoccupied space is made; and 5) control a second time interval associated with how often the information relating to the unoccupied space is broadcast.

A server can be generally characterized as comprising: a processor, a memory coupled to the processor and a communication interface for communicating with a plurality of mobile devices; where the processor can be configured to receive a request for a parking purchase from a first mobile device, said request including information including location information gathered by the first mobile device from one or more local sensor nodes in communication range of the first mobile device. The processor can be configured to 1) verify the location of the first mobile device based upon at least the location information gathered by the first mobile device, 2) verify financial information used to purchase the parking, 3) generate an electronic receipt including an electronic token used to enforce the parking purchase; 4) determine whether any promotions are available within an area that is proximate to the location of the first mobile device; 5) send to the first mobile device the electronic receipt including the electronic token and information regarding a first promotion that is available within the area proximate to the location of the first mobile device; and 6) verified a validity of a previously generated electronic token.

One aspect of the embodiments described herein can be related to a method in a server including a processor, a memory and a network interface. The method can be generally characterized as including: 1) generating a rewards account for a participant in a rewards program and storing information associated with rewards account to a mass storage device; 2) receiving, via the network interface, an indication of a purchase of parking associated with the rewards account wherein the indication includes a purchase amount; 3) determining a first amount of award points earned for the parking purchase; 4) storing to the rewards account the first amount of award points earned for the parking purchase; 5) receiving, via the network interface, an indication of a purchase of a transportation service; 6) determining a second amount of award points earned for the transportation purchase; 7) storing to the rewards account the second amount of award points earned for the parking purchase; 8) based upon the first amount of award points and second amount of award points determining an award redeemable for free or discounted parking; and 9) storing information regarding the award to the rewards account. Further, the method can include one or more of a) via the network interface, sending a message to the participant including information about the award or b) based upon the first amount of award points and second amount of award points determining an award redeemable for free or discounted transportation service. In addition, the transportation service can be selected from the group consisting of a bus, a bicycle sharing, car sharing, a water-based transportation service or a train.

Another aspect related to the embodiments described herein can be related to a method in a server including a processor, a memory and a network interface. The method can be generally characterized as including 1) generating a parking rewards account for a participant in parking rewards program; 2) receiving, via the network interface, an indication of a purchase of parking associated with the parking rewards account wherein the indication includes a purchase amount and a time period for the purchase of parking; 3) receiving, via the network interface, an indication of an activity including information about the activity and a time activity occurred; 4) determining the activity occurred within the time period for the purchase of parking; 5) when the activity is determined to have occurred during the time period for the purchase of parking, determining an amount of award points earned for the activity; and 6) storing to the memory information associated with the purchase of parking including the time period, information about the activity that occurred during the time period for the purchase of parking and the amount of award points earned for the activity to the memory wherein the award points are redeemable for parking awards.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF SELECTED EMBODIMENTS

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

Methods and apparatus are described that involve providing city services such as parking services using mobile devices.

Figure 1:
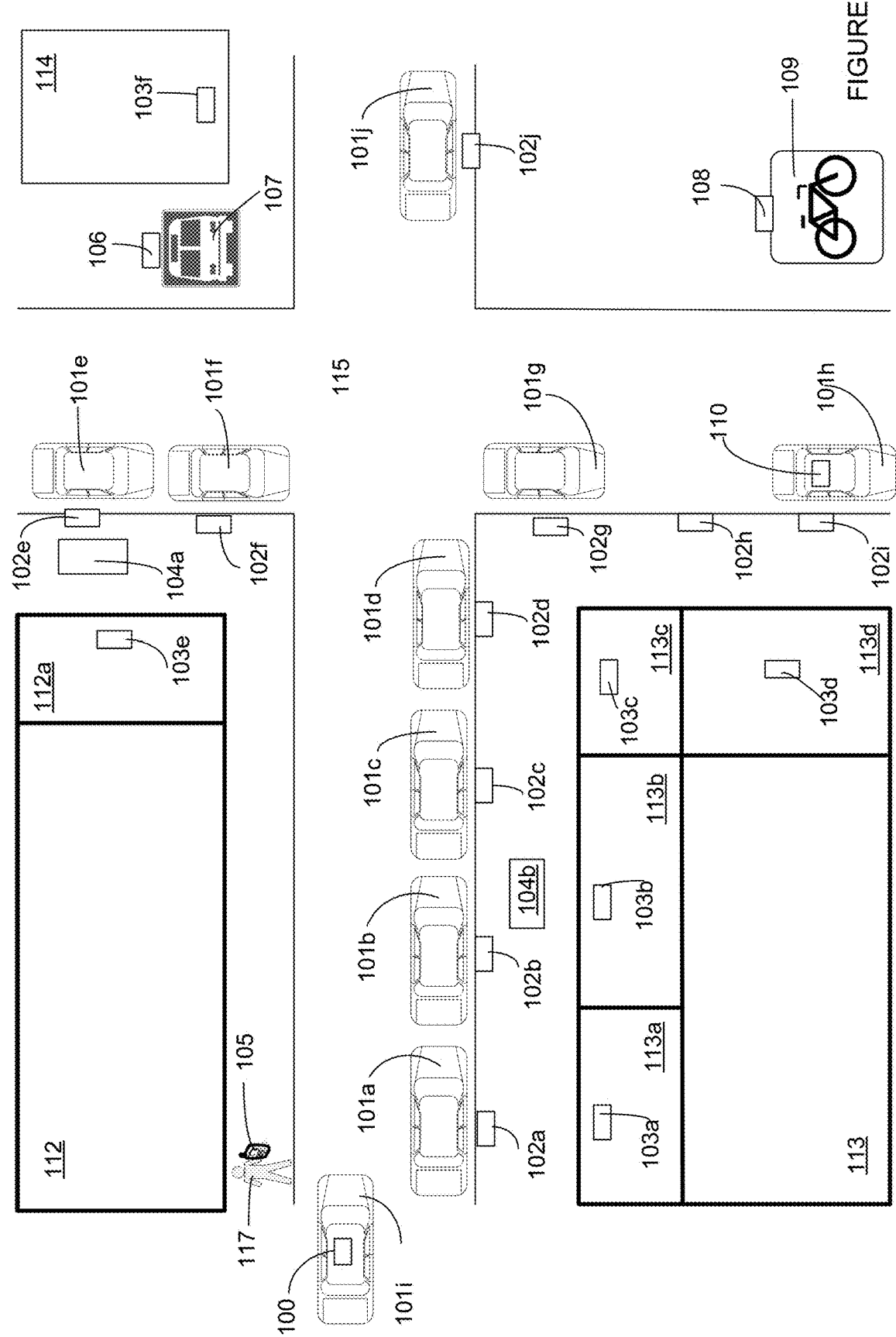
FIG. 1 is an illustration of mobile devices utilized in a city environment including sensor nets for one embodiment of the present invention.

FIG. 1 is an illustration of mobile devices utilized in a city environment including sensor nets for one embodiment of the present invention. The city environment includes roads 115, buildings 112, 113 and 114, parked automobiles 101a-101j, a mobile automobile 101j, a pedestrian 117 on a sidewalk 116, a bus stop 107, a bicycle station 109 and sensors, such as 102a-j, 103a-f, 106 and 108. The pedestrian 117 and the mobile automobile 101i are equipped with mobile devices, 105 and 100, respectively. As will be described in more detail below, real-time information about the public and/or private services can be generated by one or more local sensors and transmitted directly to one of the mobile devices, other sensors and one or more remote devices.

The building 112, 113 and 114 can be divided into one or more units, such as 112a and 113a-113d. Within each unit, a private or public entity can provide a service. For example, private services can include but are not limited to food, merchandise and entertainment services. Public services can include but are not limited to city government provided services, state government provided services and national government provided services, such as transportation services, postal services and health services. The sensors, 103a-103f, are located in units 112a and 113a-113d. These sensors can be configured to detect and transmit real-time information to a mobile device that is related to the services provided within the units. The real-time information can allow a user to make decisions in regards to the utilization of the services provided within the units.

Sensors can also be located near and associated with one or more transportation modes. These sensors can be used to broadcast real-time information that allows a user of the mobile device to make decisions in regards to formulating a transportation solution. For instance, sensors 102a-102j, are located proximate to the road 115 and can be configured to provide parking related information. Sensor 106 is located proximate to bus stop 107 and can be configured to provide bus related information. Sensor 108 is located proximate to bicycle station 109 and can be configured to provide bicycle sharing information. Sensor 110 is located in automobile 101h, which is configured for car sharing, and can be configured to provide car-sharing related information. Next, examples of real-time information that can be provided from the sensors, interactions between the sensors and a mobile device and interactions between the sensors are described.

Sensor Based Parking Services: Parking Detection and Location

In a first example, one or more sensors can detect and process information in regards to an availability of parking and broadcast this information in a manner that allows it to be directly detected by a mobile device. The sensors 102a-102i can include one or more detectors that can be configured to detect a presence of a vehicle, such as an automobile or a motor bike. After processing information gathered from the detector, each sensor can be configured to broadcast information that indicates real-time status information associated with the sensor.

For instance, a sensor can be configured to detect the presence of a vehicle. The vehicle detection can be performed at some detection interval. When a space is available, i.e., a vehicle is not present, the sensor can be configured to broadcast a message at some message interval, such as every fraction of second, every second or every few seconds. When a space is occupied, the sensor can be configured to not even broadcast a status message but may still be configured to check at some detection interval whether the space is still occupied, i.e., a status change has occurred.

The message interval and the detection interval can be based upon such considerations, as power consumption (broadcasting messages uses some amount power, thus, increasing the message interval can be used to conserve power), an expected traffic speed, a range of the sensor, how long spaces are typically occupied, a time of day and combinations thereof. For example, at night or after some time, such as midnight, the sensor can be configured to shut down or broadcast less frequently to conserve power. Further, the sensor can be configured to check less frequently whether it is occupied or not to conserve power depending on the time or other local conditions.

The message interval and detection interval do not have to be the same. Thus, a status message can be broadcast at one rate while a detection interval can be implemented at another rate. For instance, a status message can be broadcast once a second while the detection of whether a vehicle is present is performed every 30 seconds. In general, a sensor can include one or more detection devices and one or more communication interfaces where each of the one or more detection devices or communication interfaces is activated at different time intervals.

It is desirable for a mobile device located in a vehicle to receive information about a parking space in time for the driver to utilize the information. If the time interval is too long and/or the range of the sensor is too small, then a vehicle can pass the location of an available space during a time interval where a message is not being broadcast. Thus, power considerations may have to be balanced against the information being received in time to be useful.

In one embodiment, one or more of the parking sensors, such as 102a-102i, can include a sensor for detecting traffic speed and frequency. As part of a power management strategy, the sensors can be configured to determine measure how fast objects, such as vehicles, are passing the sensor and/or how frequently the objects, such as vehicles are passing the sensor. When vehicles are determined to be passing the sensor at a high rate, the sensor can be configured to increase either a frequency at which it broadcasts its status and/or increase the power used to broadcast its status and increase its message range so that it is received in a timely manner by a mobile device in an approaching vehicle. If the traffic speed is very slow, then the sensor can be configured to increase the time interval between messages and/or its rate at which it detects whether it is occupied or not to conserve power. When traffic is slow, a vehicle can be approaching an available parking space for a long time. Thus, longer detection and/or broadcast intervals can be utilized to conserve power without affecting the relevancy of the provided information.

In particular embodiments, one or more sensors, such as but not limited to the parking sensors, can be connected to a local power source, such as a solar collector. The solar collector can be coupled to a battery or a capacitor to provide back-up power, such as for night-time operations. The battery or capacitor can be chargeable, such as from the solar collector, or non-chargeable. In one embodiment, the power management can be configured to adjust operational parameters, such as a detection interval and a message interval depending on the available power. For instance, when power is plentiful and the battery is fully charged, one set of parameters for the detection interval, message interval and broadcast range of the sensor, such as a more frequent detection and message intervals and a maximum range can be used. When power is not plentiful, such as at night with a sensor that utilizes a solar collector, a different set of parameters for the detection interval, message interval and broadcast range can be used.

The one or more parking sensors can be configured detect the presence of a vehicle using a variety of apparatus in methods. For example, the one or more parking sensors can emit and detect reflected radio, infrared or sound waves to detect the presence of an object proximate to the sensor, such as a vehicle. In another embodiment, a metal detector can be used to detect the presence of a large source of metal, such as a car. In yet other embodiments, vehicle can include radio emitter, such as RFID tags that can be detected by the sensor. Also, a combination of detection methods can be employed. Further, details of detection devices that can be utilized in the embodiments described herein are described in PCT Application No. PCT/US08/07727 and PCT application No. PCT/US2009/003682, each of which is incorporated by reference and for all purposes.

In an urban parking environment, parking spaces can be delineated. For example, marking can be placed on a street surface, such as pavement to delineate parking spaces. In traditional parking implementations, a parking meter can be associated with each space. In one embodiment, one or more parking sensors can be associated with each delineated space where the one or more parking sensors can be configured to determine whether the delineated parking space is occupied. For instance, parking sensors 102a-102i could each be associated with a delineated parking space.

In alternate embodiments, the parking spaces may not be delineated. For undelineated parking, the parking sensors can be configured to determine available space over some detection range associated with the sensor. For instance, over some operating the range, such as 3-5 meters, a parking sensor can be configured to detect the presence of one or more objects and available space between the objects. The one or more parking sensors can be configured to broadcast an available space size, such as truck, large car, medium car, compact car and motorcycle or scooter or an actual distance between two objects, such as space between two adjacent vehicles.

A mobile device can be figured to filter size information received from the parking sensors so that only information about spaces of an applicable size is output. A parking application executed on the mobile device can be configured to allow a user to specify a car type where the application can communicate with a database containing car dimensions that allow the mobile device to determine the car dimensions such as a car length and then only provide information regarding parking spaces that are appropriate for the dimensions of the car. In another embodiment, a parking application can be configured to allow a user to enter a vehicle dimension, such as a car length or a scooter width and length. The parking application can be configured to add a margin to the entered vehicle dimension to determine a minimum parking space size. In operation, a mobile device executing the parking application could search for only parking spaces of an acceptable size for a particular vehicle.

In a particular embodiment, charges can be based upon how much space a vehicle occupies. For instance, smaller automobiles can be charged at a different rate than larger automobiles, such as a lower rate, and motor bikes can be charged at a different rate than automobiles. The rate can depend also depend on how an automobile uses an available space. For instance, if a vehicle pulls into an undelineated parking space that is big enough for two vehicles and parks in the very center of the space so that another can not fit, the vehicle can be charged a higher rate than if they parked at one end of the available space or another end of the available space such that another Vehicle can fit. As another example, a motor bike can be charged at different rate if it is parked parallel to a curb as opposed to perpendicular or angled to the curb. The parking sensors can be configured to measure available space before and after a vehicle has parked that can be sent to a mobile device and utilized in a rate determination.

An advantage of this approach is that a block, such as the block including the four vehicles 101a-101d can be utilized in a mixed use manner. Further, space may be more efficiently utilized. For example, at one time, a truck, a car and two motor bikes can be parked. At another time, C smaller vehicles can be parked. At yet another time, 3 vehicles and two motor bikes can be parked.

In a particular embodiment, parking sensor can comprise a camera coupled to a processor executing object recognition software. The camera in conjunction with the object recognition software can be used to recognize available spaces on a street. For instance, one or more cameras that are part of a parking sensor can be positioned over the street between buildings 112 and 113 to take a picture that covers all or a portion of the block. For instance, the sensor including the camera can be mounted to a light poll and utilize power from the light poll. The image recognition software can be used to distinguish between objects, such as vehicles and unoccupied space that is available for parking. Information regarding the available space can be broadcast such that it can be received by a mobile device. The image recognition software can also be configured to isolate the presence of a new object, such as a vehicle and isolate this object from other objects in the image. For example, the image recognition software can be configured to isolate and recognize a shape of a vehicle in a captured image.

In one embodiment, an appearance of a new object, such as a vehicle, can be determined by comparing a previously stored image to a newly taken image. In particular, an image can be generated that includes only major differences between the two or more images that are compared. For instance, common features in two compared images can be subtracted from one another to isolate new added image components, such as the presence of a new vehicle.

In some embodiments, the isolated image components can be utilized in a parking enforcement scheme. For example, the parking sensors including one or more cameras can be configured to relay information to a remote server indicating the presence of a new vehicle that has been detected. The remote server can be configured to match a purchase of parking to a vehicle image. Parking enforcement can involve providing an image or images of cars that have paid for parking and/or cars that have not paid parking. More details of parking enforcement are described with below.

A camera based parking sensor can comprise one or more cameras. These cameras can be mounted above a street, such as street 115. In particular embodiments, the one or more cameras can be one of an infrared camera, a black and white camera, a color camera or a combination of cameras, such as an infrared camera and a color camera. The infrared camera can be used at night while the color camera can that uses visual light could be used during the day.

The one or more cameras can be configured to take still images at some interval or continuous video images. The parking sensor can comprise a memory that stores some amount of image data. The parking sensor can be configured to overwrite old image data after some period. In some embodiments, the parking sensor including a camera can be configured to upload some image data to a remote device prior to it being overwritten. For instance, parking stations 104*a* and 104*b* can be configured with an access point to a wide area network that allows information gathered and processed by parking sensors, such as 102*a*-102*j* to be uploaded to a remote server.

In a particular embodiment, a combination of parking sensors and cameras can be employed. For instance, a single overhead camera might be employed to cover an area with one or more parking sensors, such as 102*a*, 102*b*, 102*c* and 102*d*. When a parking sensor detects a change in status such as a space going from unoccupied to occupied, the sensor could send a signal to a camera requesting that a picture be taken. The camera could then take a picture of the newly arrived vehicle. Image data associated with the vehicle could be forwarded to a remote server for enforcement purposes.

In yet other embodiments, the image recognition software utilized with a camera can be configured to recognize markings and other features that are associated with legal and illegal parking. For example, the image recognition software can be configured to recognize driveways as not being available for parking and not report as an available space. Further, the image recognition software can be configured to recognize markings, such as curb painted a particular color, to indicate illegal parking. For instance, the image recognition software can be configured to recognize a bus stop marked red and not report it as available parking.

In particular embodiments, mobile devices, such as a mobile device 100 located in vehicle 101*i*, can be receive information directly from one or more of the parking sensors and output to a user in some format that allows the user to be directed to an available parking space. The mobile device could be but is not limited to a phone or a portable computer of some type, such as a laptop computer, a netbook computer or a personal digital assistant. The mobile device can mounted to the car in some manner, such as on a dashboard or the back of a seat in taxicab.

As an example, the mobile device 100 in car 101*i*, could receive information from parking sensor 102*h* that is space available. The mobile device 100 may receive the information directly from the parking sensor 102*h* or indirectly via a parking sensor that networks with parking sensor 102*h*, such as sensors 102*a*-*d* or parking station 104*b*. In some embodiments, groups of sensors can be networked together to form local sensor nets. For instance, the parking sensors on a particular block can be linked together, such as sensors 102*a*-*d*, 102*g*, 102*h* and 102*i*, to form a local sensor net.

Information can be shared among sensors in the sensor net to effectively extend the range of the sensors in the sensor net. For instance, information about the available parking space at 102*h* can be sent to sensor 102*a* directly or via one or more intermediate devices, such as from sensor 102*h* to sensor 102*b* and then to sensor 102*a*. In this example, the broadcast range of sensor 102*h* or the sensitivity of the detector of mobile device 100 may not allow the mobile device to directly receive transmissions from sensor 102*h*. Nevertheless, the mobile device may be in range of sensor 102*a* and thus, learn information about the available parking space from sensor 102*a* that was transmitted directly from sensor 102*h* to 102*a* directly or through one or more intermediary devices. More details of network topology and the configuration of sensor nets are described with respect to FIG. 2.

The information received by the mobile device directly from a parking sensor, such as 102*h*, or via other local intermediary devices, such as 102*a*, 102*b*, 102*c*, 102*d*, 102*f*, 102*g* or 104*b* can be processed by the mobile device and output such that a driver of car 101*i* can be directed to the available parking. For instance, an application executed by the mobile device could be configured to output a local map including the location the available space displayed on the map and the current location of the mobile device. The map can include visual indications of directions such as a line drawn from the current location of the mobile device to the available space proximate to parking sensor 102*h*. The application executed on the mobile device can also be configured to alternately or in combination with the map provide audio directions to the available space, such as 'turn right at the next intersection.' Further details of applications executed on a mobile device that can be utilized with the sensors described herein are described with respect to FIG. 2.

In one embodiment, the mobile device can be configured to determine its current position using a GPS device, such as a GPS device integrated into the mobile device. In other embodiments, the mobile device can be configured to determine its position based upon data received from the one or more parking sensors. For example, based upon signals received from the one or more parking sensors, the application executed on the mobile device can be configured to triangulate or estimate its position in some manner. The parking sensors can be configured to broadcast position information and/or the position of the parking sensors can be recorded when they are installed so when the parking sensor is identified in some manner, position information associated with the parking sensor can be determined.

In yet other embodiments, a combination of GPS data and data received from the one or more parking sensors can be used to determine a current position of the mobile device. In a city environment, the user of sensor data to estimate position can be beneficial because tall buildings can block GPS signals. Further, the sensor data may allow position to be estimated on non-GPS equipped devices.

Parking Transactions

After a car, such as 101*i*, arrives at an available parking space, such as the space located proximate sensor 101*i*, a transaction to purchase parking can be initiated via a mobile device 100 carried in the car 101*i*. The transaction can be initiated using a parking application executing on the mobile device and utilizing a remote communication interface associated with the mobile device, such as a cellular or radio interface (e.g., Wi-Fi). The remote communication interface can allow the mobile device to communicate with a remote device that is authorized to provide a parking transaction including the purchase of parking.

In one embodiment, the mobile device can be configured to communicate with a parking base station, such as 104*a* or 104*b*. The parking application can be configured to send identifying information to the mobile base station, such as information gathered from the parking sensors, which could include a space identifier, information input and/or stored within the device, such as a space number, license plate number, an amount of parking time to purchase, a parking account number, a PIN, and/or financial information (e.g., a credit/debit card) info.

The PIN can be used to authorize the transaction. For instance, a user can be required to enter a PIN associated with a parking account and/or a PIN associated with a credit/debit account. In one embodiment, a user can possess a pre-existing parking account. The parking account can store a fund amount from which the funds can be deducted for a parking transaction. The parking account can be associated with particular vehicles, such as vehicles that are owned by the user or currently being rented by the user. The parking account can be configured such that parking transactions can only be authorized for the vehicles associated with the parking account. Thus, if a user lost their mobile device, another person possessing the mobile device could be discouraged from purchasing parking associated with another vehicle because the any purchased parking would not be valid for cars other than the vehicles associated with the owner of the mobile devices parking account.

The parking base station, such as 104b, can be configured to receive information from the mobile device, validate information, such as parking account and credit information and approve a parking transaction. The parking base station can include a communication interface that allows the parking base station to contact remote devices for the purposes of validating transaction information, such as financial and/or parking account information.

The parking base station can also be configured to upload transaction information to the remote server. User parking account information can be stored on a remote server. After the parking base station approves a parking transaction, it can upload the parking transaction to the remote server. The remote server can receive the information and update a user's account, such as deducting funds from the user's account associated with the transaction.

In a further embodiment, the parking base station and/or the one or more parking sensors can be configured to receive radio information from a source located on the vehicle. For instance, parking base station and/or one or more parking sensor can be configured to read an RFID stag secured within the vehicle. The RFID tag can be configured to broadcast information in response to a signal received from the parking base station or sensors, such as a record locator to a record stored on a remote device where details about the vehicle are stored within the record. A vehicle record including vehicle information, such as a license plate number, can also be stored in the RFID tag and read by the parking sensor and/or parking base station. Information read from an RFID tag or other radio-based device located within the vehicle can be used as part of a parking transaction as well as for enforcement purposes. Further details of using RFID tags and radio-based devices are described in more detail with respect to PCT Application No. PCT/US08/07727 and PCT application No. PCT/US2009/003682 previously incorporated herein.

In another embodiment, rather than using the parking base station, such as 104b, to purchase parking, the parking application can be configured to contact a remote parking server directly via one of the communication interfaces available on the mobile device and initiate a parking transaction similar to the one described above with the parking base station. Thus, the remote parking server can be configured to process parking transactions at locations throughout the city based upon communications with mobile devices located throughout the city. An advantage of this approach is that a parking transaction can be approved without requiring a city to install and maintain a large network infrastructure separate from existing communication networks because the parking transaction utilizes pre-existing networks associated with the user's mobile device.

Another advantage is that the user can purchase parking while remaining in their vehicle. For instance, if it is raining the user could purchase parking without walking to a parking base station initiating a transaction and then returning to their vehicle, which could be desirable to the user. Yet another advantage is that it can be possible to purchase parking while the user is not in the immediate vicinity of the vehicle or a parking base station. For example, a user could arrive in the vehicle 101i at the spot 102h and then the leave the vehicle with their mobile device 100 and go to a remote location in another area without purchasing parking, then, the user could remember that they forget to purchase parking and initiate parking from a remote location.

In some embodiments, it can be possible, via their mobile device, to initiate a purchase of parking from a location that is remote to their vehicle. For instance, parking can be purchased prior to the vehicle actually arriving at a parking space where pre-purchased parking transaction can be completed after the user finds parking. If the user does not find parking or decides not to make the trip, then the pre-purchased parking can be utilized at a later time.

In other embodiments, a user can be required to return to their car and possible move their car to purchase parking. For instance, to initially purchase parking a user can be allowed to purchase parking remotely. However, to renew their parking, the user can be required to return to their car and then move their car to another location before parking for the car can be renewed. Location information gathered from a GPS device located in the mobile device as well as location data associated with or determined from the parking sensors can also be used to determine that the user is now in another location.

The purchased parking can be associated with a particular location or area. Thus, if the user merely walked to a new location and purchased parking without moving their vehicle, the new purchase of parking would not be valid for their vehicle in their old location. During parking enforcement, the parking status of vehicle can be checked including whether it is in a location for which parking was purchased by associating location data with the parking purchase.

In yet other embodiments, the parking application can be configured to determine that a user has stopped and remind them to purchase parking. For instance, the mobile device can include an accelerometer and based upon accelerometer data, as well as other data such as sensor data gathered from the device, the parking application can be configured to make a determination as to whether the mobile device resides in a vehicle that has recently parked. For instance, if the parking application has provided guidance to a particular location and has determined it is now located at the particular location, it can remind the user to purchase parking. When the parking application determines that it is in a vehicle that has recently been parked, it can be configured to generate some reminder detectable by a user to purchase parking, such as a vibration, a sound, visual message, an audio message or combinations thereof.

The parking base station, such as 104a or 104b, can include a wireless access point, such as a Wi-Fi connection, that can be used by the mobile device to communicate with a remote parking server. This type of access point could allow Wi-Fi enabled devices that are not cell phones, such as a laptop computer or an IPod Touch,™ to be used for purchasing parking. Further, many cell phones also provide Wi-Fi capabilities. Thus, the access point can provide an alternate communication path for carrying out the transaction in the event that cellular coverage is poor at a particular location.

In particular embodiments, parking transaction can be generated that allow a user to park in a particular location, such as a particular delineated parking space. In other embodiments, the user can purchase parking for a zone, which can be a particular area within the city. The parking transaction can allow a user to park within the zone for a time period selected in the purchase. This type of transaction can allow a user to purchase parking and then move their vehicle from location to location without purchasing additional parking while their parking transaction is valid.

In particular embodiments, the parking application executed on the mobile device can be configured to keep track of whether or not the mobile device is located in the zone for which parking was purchased and whether the parking transaction is still valid. Further, parking rates can be varied according to whether the parking is limited to a particular space or a particular zone. For instance, a higher parking rate can be charged for purchase of zone parking as compared to parking limited to a particular space.

After a purchase of parking, the parking base station or the remote parking server can send an electronic receipt to the mobile device, such 100, as a record of the purchase. This electronic receipt can be utilized in the case of a dispute. For instance, if the user receives an unwarranted parking violation, the electronic receipt could be used by the user to have unwarranted parking violation rescinded. The electronic receipt could include information, such as a time of purchase, a car for which the purchase, a time period for which the parking is valid and a location or area for which the parking transaction is valid.

Parking Related Promotions

In addition, promotions can be associated with the electronic receipt. For instance, the user can receive a promotion with their receipt that encourages them to use another city service, such as a discount on public transportation available at the bus stop 107 or the bike station 109. The promotions can be related to their parking purchases, such as a bonus amount of time added to their purchase, a discount on the next parking purchase or free parking for some time period. These types of promotion can be used to encourage users to utilize the parking services a city is providing.

In other embodiments, the promotions can involve tie-ins with merchants. From these tie-ins, a city may be able to generate additional revenues that defray the costs associated with implementing the methods and apparatus described herein. For example, merchants can sign up with the city to display advertising which can include promotional information associated with the merchant on the electronic receipt. When as part of a parking transaction, a location is determined, the merchant tie-ins or other city service tie-ins can be location based, such that the promotions are triggered when a parking transaction occurs at a particular location. For instance, a merchant could request that advertising and/or promotion information only be sent to the mobile device from which parking is being purchased when the location associated with the parking transaction is within some distance of one of their stores, such as ¼ mile. The promotions can also be time sensitive, such as a happy hour at local bar from 4 pm-6 pm or a 20% discount at a store only good for only the next hour.

A user receiving such a promotion can be required to show the electronic receipt including the promotional information to receive the promotion. For instance, if the user received a 20% discount from a local merchant that was downloaded to with the receipt, the user can be required to show the message including the receipt to have the discount applied to their purchase. In some embodiments, the receipt including a promotion, such as a 20% discount can be generated with a unique identifier, such as a number or a bar-code that is sent with the promotion in the electronic receipt. This unique identifier could be stored on a remote device that is accessible to the merchant. The unique identifier can be checked at the time the promotion is utilized to determine whether the promotion is valid and whether it has been redeemed. In some embodiments, a promotion, such as a 20% discount, can only be used once or a limited number times and then is no longer valid. The unique identifier can be used as a record locator for a record stored on a remote device to determine whether the promotion has been previously redeemed and to check whether it is still valid.

Parking Enforcement

The electronic receipt can also include information used in a parking enforcement schema. For instance, the electronic receipt can include a unique electronic token. In one embodiment, the mobile device can be left in the car and configured to broadcast information related to the electronic token. A receiver device can be configured to receive the broadcast information and validate the information regarding the electronic token, such as whether it is valid or not valid, and then provide an indication as to whether the electronic token is valid. When the electronic token is generated, information about it can be stored in a remote device, such as a remote server or one of the parking stations, such as 104a and 104b. The receiver device can receive information about the electronic token from the mobile device and then validate it against information stored on a remote server or within one of the parking stations. The electronic token can have a limited lifetime, such as the length of time for which parking has been purchased. Thus, an invalid electronic token can be a token that has expired.

In another embodiment, an inexpensive transmitter can be utilized that is configured to receive a download of an electronic token, such as from a mobile device or a nearby parking station, such as 104a and 104b. In the case of the mobile device, a wired or wireless communication can be used to communicate with the transmitter. The transmitter can be secured within the interior of the car, such as mounted to the dashboard. The transmitter can be configured to receive information regarding a current electronic token and broadcast the information in the electronic token for enforcement purposes.

The transmitter can have a unique identification code associated with it, so that electronic token can be paired with the transmitter. This pairing can be used to prevent the electronic token from being copied and downloaded to another device, such as another transmitter. The electronic token can also be paired other information such as vehicle identification information and license information to prevent it from being utilized in an unauthorized manner. For instance, an authentication of the electronic token can require comparing a location at which it was issued with a current location of the receiver receiving the token information. The electronic token may only be considered valid if it received within some area associated with the location at which is original issued.

In one embodiment, the transmitter can have a button or switch, such as spring loaded button or switch that has to be manually engaged to update the transmitter with a new electronic token. This embodiment can be used so that a person has to be physically present with access to the interior of the vehicle before the electronic token can be updated. In another embodiment, a small display, such as an e-ink display, can be mounted within the vehicle, such as in the interior of a windshield or on a back window. The e-ink display can include a wired and/or wireless interface that allows it to receive a download of an electronic token. The e-ink display can also include a button or switch that has to be manually engaged to update the display with a new electronic token.

The electronic token can be displayed on the display in a combination of numbers, letters, symbols, such as a barcode and combinations thereof. Other information, such as a time of issuance and/or an expiration time can also be output on the display. This electronic token can be read by a passing device, such as a bar-code reader, a camera with image recognition software or visually by a person for enforcement purposes. Again, information about the electronic token can be paired with other identification information, such as a location at which it was issued or a vehicle identifier, such as a vehicle license plate to prevent unauthorized use of the token.

In yet another embodiment, the parking station, such as 104a and 104b can include a printer. An electronic token could be printed as ticket with a bar code or a number/letter combination and output from the parking station. The printed ticket could be placed within the vehicle for enforcement purposes.

Sensor Based Public and Private Services

As previously described, the sensors describes herein can be configured to detect and broadcast real-time information other than parking information. For instance, sensors, such as 103a-103f, are located in various building and building units where public and private services are provided. The services can be related to private services, such as groceries, entertainment, merchandise and hair services or public services, such as postal services or other government provided services. The sensors provided in each building unit can be configured to provide real-time information about the service.

For instance, a sensor could be configured to detect or be configured with information indicating whether the service is available or not, i.e., a business can be closed. This information can be received by a mobile device, such as mobile device 105 carried by the pedestrian or mobile device 100 located in the vehicle 101i. The sensor can be configured to detect how many people are in the unit and determine from this information whether there is a long wait for the service. For instance, a sensor located in post office can be configured to count the number of people entering and the building and determine an estimated wait time based upon the number of people it has counted.

In some embodiments, the sensors can be transmitters that are configured to broadcast real-time information that can be of interest. For instance, the sensors can be configured to receive information for broadcast indicating whether a store, such as a grocery store is very busy and there is a long line at the check out. As another example, a sensor located in a restaurant can be configured to broadcast information whether any tables or available or how long the wait is for a table. In yet another example, a hair or nail salon could provide a sensor that broadcast information regarding whether anyone was available for a walk-in appointment. In another example, a sensor can be configured to broadcast a current status of the establishment, such as a happy hour with discount drinks or a promotion in a store that is immediately available.

The sensors can also be configured to broadcast a link that can be used to locate more information about the establishment. For instance, a sensor in a restaurant can broadcast a link to a device located on the Internet that allows a user to see one or more reviews of a restaurant or a description of the menu. This link can be received by a mobile device, such as mobile devices 100 and 105, from one and more sensors. In response to receiving the link, a mobile device, such as 100 and 105, can be configured to gather additional information from the location on a network indicated by the link and output it in some format that is useful to the user.

In one embodiment, the mobile device located in vehicle 101i can be configured to display information received from a sensor as a label or symbol on a map with some indication of status information received from the sensor. For example, a sensor from a restaurant can be configured broadcast its type, such as Chinese food, and its status, such as open, or a stats us such as 5 minute wait for tables. This information could be received from the mobile device and output in some format, such as an audio format, a visual format or combinations thereof.

The mobile device can be configured with filters such only certain types of information are output. For instance, a person, such as a tourist, that is unfamiliar with an area could drive into an area looking for a particular type of establishment, such as a restaurant or a clothing store in vehicle 101i. As another example, a person, such as a pedestrian 117 can walk into an area. Their mobile device, such as 100 or 105, can be configured with a filter such that only information about restaurants is output from the mobile device. The mobile can be receiving information in other categories, such as parking information from sensors 102a-102f or transportation information, such as from sensors 106 and 108, but after the specified filter is applied it may not be output by the mobile device.

As an example, a user can be driving in the vehicle 101i looking for restaurants. The mobile device 100 can be configured to output only information related to restaurants. At some point, information can be output from the mobile device regarding a restaurant of interest to the user. The mobile device can be configured to receive an input that indicates that the user now wants to look parking. After receiving the input, the mobile device can be configured to stop outputting information about restaurants and start outputting information related to parking, such as available parking spaces.

In another embodiment, the mobile device can be configured to filter information, such that only information about one or more specific establishments is displayed. For example, a user can set the filter of a parking application executing in a mobile device located in their car to only display information in regards to a particular post office or a particular restaurant. Based on this information, the user can decide whether they wish to park or not to park. For instance, a user can travel to area to use a particular post office and set a filter in their parking application accordingly. Prior to parking, the user can receive information indicating the post office is very crowded or not open, which is output via the mobile device. Based upon this information, the user can decide whether to leave the area and abort their trip or whether to find parking.

The mobile device can be configured to store information gathered from various sensors including information that is filtered out and not output. For instance, a user, such as pedestrian 117 can be walking in area with mobile device 105 that is collecting information various from local sensors. The mobile device can be configured with a filter, such that only one type of information is being output. At some point, the user 117 of the mobile device can decide that they are interested in another type of information. The mobile device can be configured receive a selection of the new type of information and search and see whether any information of the new type the user is interested is currently being detected or has been recently detected by the mobile device. The mobile device can then be configured to start outputting information about newly selected type of information.

As an example, a user, such as 117, can enter an area on foot looking for restaurants. As the user walks around in the area, the mobile device 105 can be configured to output any information it has received from local sensors about restaurants. Nevertheless, the mobile device 105 can be receiving other types of information from local sensors, such as information about a grocery store that the user passed on their walk.

At some point, the mobile device 105 can receive a selection indicating that the user is interested in locating a grocery store rather than a restaurant. The local sensor that sent information about the grocery store can be out of range of the mobile device 105. Nevertheless, the mobile device can be configured to determine it has recently detected some information about a grocery and output it in some manner. For instance, the mobile device could be configured to show it detected a grocery store located 4 blocks away and that the information it received at the time indicated that the grocery store is currently open. The user could use this information to return to the grocery store.

Sensor Based Transportation Services

As previously described, the parking services described above can be part of an integrated transportation services that are provided using the local sensors described herein. Transportation sensors can be placed throughout a city to provide real-time transportation information associated with a particular area. These transportation sensors can be associated with various modes of transportation that are available in a particular area. The transportation sensors can be configured to broadcast information that can be received by a mobile device, such as the mobile devices 105 and 100 that are in range of the transportation sensors. Some examples of transportation modes include but are not limited to bus, taxis, parking, bicycle sharing, car sharing, water-based transport (e.g., ferries) and trains.

As an illustration, as the pedestrian 117 and the driver of car 101*i* enters the area, their respective mobile devices, 100 and 105, can start gathering information from local transportation sensors as well as other types of local sensors. The mobile devices can be configured to execute a transportation application that gathers and processes transportation information received from local transportation sensors. For instance, the mobile devices, can receive information from the bus stop sensor 106, the bike station sensor 108, the car share sensor 110, a train station sensor (not shown) and a taxi stand sensor (not shown), process the information and then output it in a format that is useful to user.

The transportation application can be likened to a more general embodiment of the parking application described above, i.e., the parking application and its functions are one embodiment of a transportation application. Thus, many features described with respect to the parking application can be subsumed into the transportation application described below. Like the parking application, the transportation application can provide data filtering in regards to what data is output by a mobile device executing the transportation application. For example, a transportation application executing on a mobile device can gather information from multiple types of transportation sensors but only output information related to one or more types of transportation specified by a user, such as only taxi information or only car-share and bicycle information. However, like the parking application described above, the transportation application can be configured to store information gathered from local sensors that is not output for some time period. This transportation data can be accessible via the transportation application. For instance, recently gathered transportation information that is has been filtered out, can be accessed when filter settings available with the transportation application are changed.

The sensors can be configured to broadcast information about local conditions relevant to a user of the service. This information can be gathered locally, i.e., directly detected by the sensor, but can also be received from other remote devices and broadcast by the sensor. For example, a bus stop sensor, such as 106, can be configured to detect directly and broadcast information, such as how many people are waiting at a bus shelter or whether the bus stop 107 is crowded, the last time a bus passed, an average time between busses, location information that allows the bus stop to be placed on a map, such as a mapping application available on the mobile device, an expected time for next bus, fare information, bus services available at the bus stop, such as route numbers and network links to additional bus information pertinent to the bus stop, such as route maps and schedule information associated with busses that frequent the bus stop.

The bus stop sensor 106 can also receive information from other sensors or other remote devices. For example, the bus sensor 106 can be configured receive information from one or more upstream sensors on bus route that a bus has just departed a stop and is now approaching and broadcast this information. Further, the bus stop sensor 106 can be configured to detect a bus has just departed the bus stop 107 and notify a downstream sensor that the bus has just departed. In addition, busses can be equipped with transponders that allow their position to be determined. This information can be reported to some centralized bus server that tracks all of the bus positions. The bus stop sensor 106 can be configured to communicate with the centralized bus server and receive bus information that is pertinent to the bus stop, such as an estimated time that the next bus will arrive and information about the bus. The information received from the centralized server can be broadcast by the sensor, such as bus stop sensor 106.

In other embodiments, the bus stop sensor 106 can have capabilities similar to the parking station, such as 104*a* and 104*b*, or can be associated with a bus transportation station. For instance, the sensor 106 or the bus transportation station can provide a network access point, such as a Wi-Fi spot, that allows a mobile device to access a remote server, such as the centralized bus transportation server or remote server that provides a plurality of different types of transportation transaction. In yet other embodiments, the bus stop sensor 106 can have transaction capabilities. For instance, the bus stop sensor 106 can enable a purchase of bus fare via a mobile device, such as while the person is waiting for the bus. The transaction can be enabled via a communication between the mobile device and the bus stop sensor 106 or an associated bus transportation station. In addition, as previously described, transactions can be enabled via some remote device, such as bus transactions server, that is capable of communicating with the mobile device directly via a communication interface associated with the mobile, such as data network that is accessed by the mobile device.

In general, transportation kiosks, such as the parking station or the bus transportation station, can be used to provide transactional access to one or more transportation modes. For instance, the parking stations, alone or in combination with a remote device can be configured to enable purchases of bus transportation and parking transportation. As a further example, a kiosk located at the bus stop 107 (i.e., the bus transportation station) can be configured, alone or in combination with a remote device, to allow the purchase of parking, bus transportation or other forms of transportation. Further, a remote transportation server can be configured to support multiple types of transportation transactions, such as transactions involving taxis, parking, buses, car sharing, trains, ferries and bike sharing.

The transportation kiosks may or not include a local interface, such as input devices and a display. In some embodiments, the interface to the transportation kiosk is provided only by a user's portable device. In other embodiments, the kiosk can comprise a local interface, such as a touch screen display, and a printer, and also provide access via a mobile device, such as a user's cell phone.

Like the parking example, as part of a transaction, an electronic token can be downloaded to the mobile device as part of the transaction and used as bus fare. For example, an image of a bar code can be downloaded to the mobile device. When the user's enters the bus, the bar code can be scanned by a device on the bus and validated allowing the user to pay their fare. Similar purchases could be made for taxis, car shares, bike shares, trains and other forms of transportation. Like the parking example, promotions can be implemented as part of the transaction process.

In addition, the bus sensor 106 and/or an associated device similar to the parking station can be configured to enable purchases of transportation that are useable for multiple transportation mode, such as a transportation pass, that can be used to access to access public transportation modes, such as trains, busses, bikes, car shares and combinations thereof for a particular time period. Like the parking example, the passes can be zone dependent, i.e., any mode of transportation within a zone for a particular time period.

In other embodiments, passes can be linked to particular forms of transportation and rates for the passes can be charged according to the forms of transportation that are linked to the pass. For instance, a bus only pass can be purchased for one amount, a bus and train pass can be purchased for another amount, a bike and car share pass can be purchased for yet another amount. Again, a user employing such as pass can be provided a unique electronic token, such as but not limited to an image of a bar-code that is displayed on a display of the mobile device or a physical token, such as a printed ticket, that can be presented to gain access to the various modes of transportation.

In yet embodiments, transportation purchases can be enabled that allow the purchase of private transportation, such as a purchase of taxi fare. As an example, a mobile device can be configured to allow a purchase of a pass enabling unlimited travel by taxi within a particular zone or between multiple zones for a time period. The taxi pass, which can be in the form of an electronic token, can be presented and validate each time a user enters a taxi cab. Information can be sent to a central server that records that the pass has been used and what taxi cab company is redeeming the pass. During the ride, the taxi can be configured to measure usage data, such as distance traveled. When the user exits, the taxi cab, this information can be transmitted and associated with the purchased pass. This process can be repeated each time the pass is used.

The taxi cab services can be provided by multiple taxi cab private companies. After the pass expires, based upon the usage information associated with the taxi pass, such as which cabs redeemed the pass and optionally, more detailed usage information, such as distance traveled, revenue from the purchase of the pass can be split among the entities that redeemed the pass. If the pass is not redeemed before it expires, then possibly all of the participating cab companies can receive a share of the revenues. A similar process can be used to split revenues from a pass that was purchased from multiple modes of public transportation. For instance, if a user bought a train and bus pass and only used the train the pass revenues can be sent to just the train service provided. If the used both the train and the bus, the revenue can be split accordingly.

In a particular embodiment, purchases can be enabled that allow a user to access a mix of both public and private transportation. For instance, a user can purchase a train and a taxi pass that allows the user to utilize either forms of this transportation for a time period within a specific area. As described above, a revenue sharing model can be utilized that allows proceeds from the purchase of the pass to split between the different transportation providers.

Returning to FIG. 1, the bicycle sensor 108 can be configured to provide information about bike sharing, such as whether one or more bikes is available for sharing at the bike station 109, rate information, etc. Similarly, the car sharing sensor 110, can be configured to provide information about the car share, such as whether it is available and for how long it is available, usage restriction and rate information. A taxi stand sensor (not shown) can be configured to be broadcast information regarding how many be people are waiting at a taxi stand, an estimated wait time and a number of cabs waiting.

Sensor Net System

Figure 2:
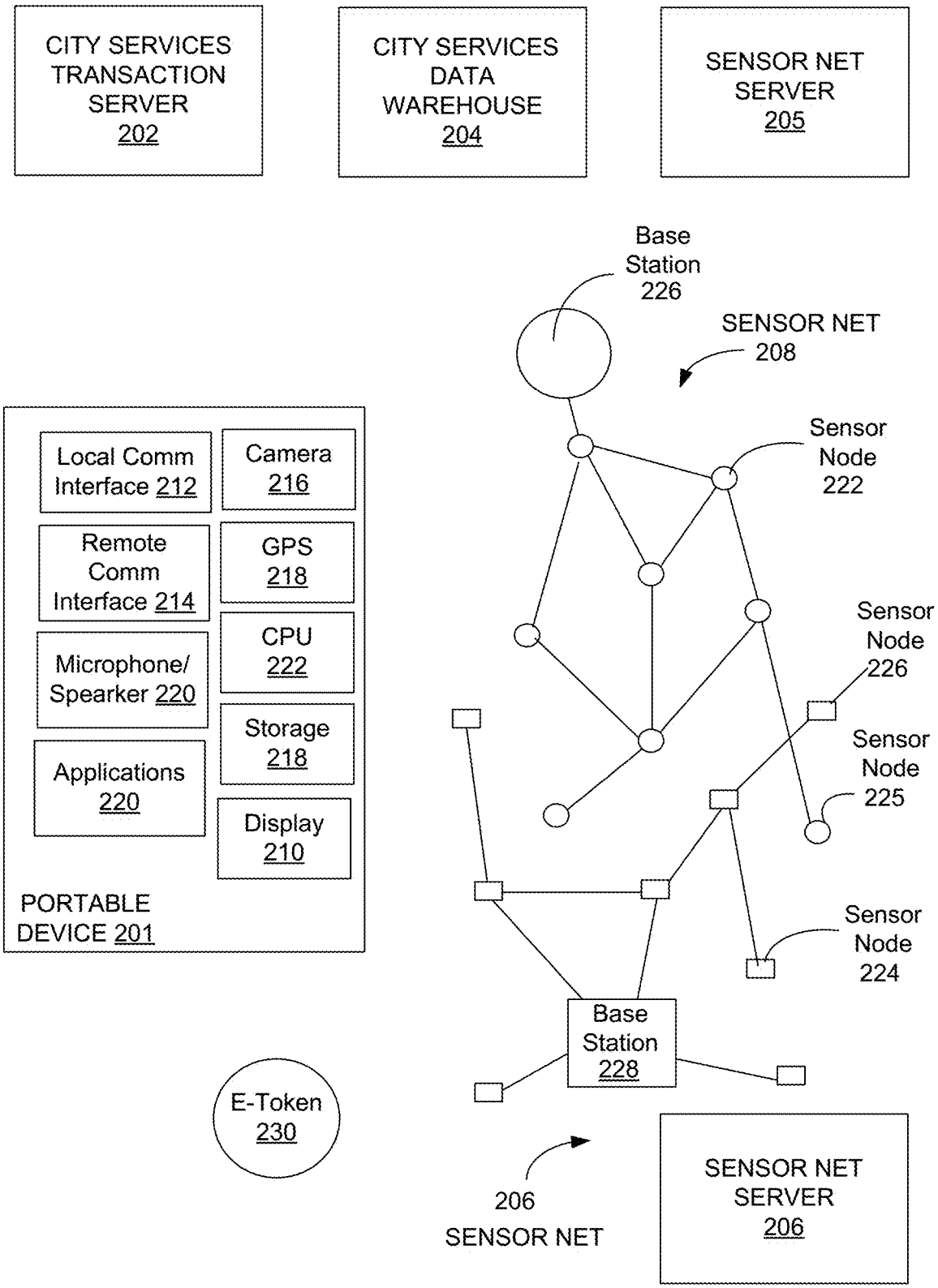
FIG. 2 is an illustration of a system for providing city services comprising a mobile device, sensor nets and remote servers for embodiments of the present invention.

FIG. 2 is an illustration of a system for providing city services comprising a mobile device, sensor nets and remote servers for embodiments of the present invention. The components shown in FIG. 2 are provided for illustrative purposes only and systems with more components, less components and/or different components can be utilized with various embodiments of the present invention. The system comprises a system 202, a city services data warehouse 205, a sensor net server 205, a sensor net server 206, a portable device 201 and an E-token device 230.

Sensor net 206 comprises a plurality of sensor nodes, such as 224 and a base station 228. Sensor net 208 comprises a plurality of sensor nodes, such as 222, and a base station 226. Examples of sensor nodes that can be configured as part of a sensor net are the parking sensors, 102a-102f, and the sensors, 103a-103f, associated with services located in various buildings described with respect to FIG. 1. Further details of a sensor node are described in more detail with respect to FIG. 3.

The base stations, 226 and 228, can be configured to gather data from one or more of the sensor nodes in a sensor net and transmit data gathered from the one or more sensor nodes in the sensor net, such as 226 and 228, to a remote server, such as sensor net server 205 or sensor net server 206. A sensor net, such as 206 and 208, can comprise multiple base stations. Examples of a base station, such as 226 and 228, include the parking stations, 104a and 104b, and the transportation kiosks described with respect to FIG. 1.

In some embodiments, a sensor node can have the capability to act as a base station. For robustness and possible as part of a power conserving measure, a sensor net, such as 205 or 206, can be configurable to change which node is acting as a base station. For instance, if sensor node 222 was configured to communicate to base station 226 and the sensor node 222 was unable to communicate with the base station, sensor node 222 can be configured to switch to a base station mode and notify other sensor nodes in the sensor net that it is now providing this function. In response, other sensor nodes in the sensor net may begin routing communications through the sensor node 222, when it is acting as a base station. While acting as a base station, sensor node 222 can be configured to continue performing the functions of the sensor node, such as detecting information and broadcasting information.

The sensor nets, such as 222 and 224, can be organized in various manners. In some embodiments, a sensor node, such as 222 and 224, can be configured to operate when it detects and broadcasts information. In a particular embodiment, a sensor node can be configured act in a stand-alone mode, such that it does not receive communications from or interact with other sensor nodes or other mobile devices, such as portable device 201. Nevertheless, in the stand-alone, it can be configured to detect and broadcast information based upon its sensor capabilities.

In a particular embodiment, information detected from a sensor node may only be gathered via portable devices, such as 201. For instance, an application executing on the portable device 201 that is configured to receive information from the sensor node can be configured to periodically upload the data to a remote server, such as a city services data warehouse 204. The information that the mobile device uploads can be related to the information it is has gathered from one or more sensor nodes.

The application to gather and process information with the sensor nodes can be downloaded from a remote site, such as an application store like iTunes.™ One condition that a city can impose for allowing access to its sensor nodes via the application is that the application is allowed to gather and periodically report information that it has gathered to a remote server. An advantage of this approach is that it can be possible to gather information from various sensor nodes even when the sensor nodes are not configured to communicate in an interactive manner with other sensor nodes or portable devices, i.e., the sensor nodes are configured in a stand-alone mode.

In other embodiments, the data from a sensor node can be piggybacked on other types of communications. For instance, when the portable device 201 is communicating with a remote server, such as the city services transaction server 202, extra data that is not needed to complete the transaction can be piggy-packed to the transaction. As described above, the application to gather, process information and perform transactions involving data gathered from the sensor nodes can be downloaded from a remote site, and one condition that a city can impose for allowing access to its sensor nodes via the application is that the application is allowed to communicate in this manner, i.e., piggy back extra data to a transaction communication.

In yet others embodiments, a sensor node, such as 222 or 224, can be configured to receive and transfer information to another sensor node. For instance, sensor node 222 can receive information from an adjacent node and then relay the information to the sensor adjacent to base station 226, which forwards the information to base station 226 for transmission to a remote sensor net server, 205. In this example, the sensor nodes can be configured to communicate with other sensor nodes in this manner but may not allow other devices, such as portable device 201, to communicate with them in this manner. Thus, the portable device 201 can be configured to only receive information from a sensor node but not send information to the sensor while the sensor nodes, such as 222 and 224, can be configured to broadcast information that can be received by other devices, such as the mobile device, and possible communicate with other sensor nodes and base stations.

The sensor nodes operating in a sensor net can be configured to organize in a particular structure and share certain types of information. For instance, parking sensors that are located around a square or rectangular city block can be configured to organize in a block sensor net that encompasses the city block. When one of the parking sensors in the block sensor net detects that it is unoccupied, this information can be sent to other parking sensors in the block sensor net, such as sent to adjacent nodes in the block sensor net until each of the parking sensors in the block sensor net knows about any available parking in the block sensor net. The sensor nodes can be configured to detect whether it has already received a message, such as information about available parking at a node, and only forward messages it has not previously received to one or more of its neighbors in the sensor net.

Each of the sensors in the block can be configured to broadcast information about available parking that is detected by the block sensor net. This topology effectively extends the broadcast range of each parking sensor because information can be propagated some distance away from each sensor that is beyond its normal broadcast range. Also, transmissions that can be blocked because of intervening objects, such as a building, can be propagated. For instance, when a line of sight transmission is not available between a mobile device and a sensor node because a building is in the way, information can be propagated around the building, such as around a corner using some type of network topology that allows the information to be propagated to another sensor in the sensor net that is able to establish communications with the mobile device.

Sensor nodes can be organized in various grouping and the present invention is not limited to a block topology. Further, groups can be overlapped, such that a sensor node is a member of two or more groups, so that information can be propagated between groups. For example, sensor node 225 is part of sensor net 208 and sensor node 226 is part of sensor net 206. The sensor nodes in each of the respective sensor nets can be geographically distributed, such that most of the sensor nodes in each sensor net are out of communication range with one another. Sensor nodes 225 and 226 can be within communication range of each other. These sensor nodes can be members of each of sensor nets 206 and 208, so that information can be propagated between the sensor nets.

It can be desirable that information received at a particular location is relevant to that location. Towards this end, the sensor nodes can be configured to limit how far information is propagated. For instance, an original message can be generated with a counter that is added to the message. The counter in the message can be incremented each time it is forwarded from one node to another node. Each sensor node can be configured to only forward messages that have been forwarded a number of times less than some limit. This approach may limit distance a message can travel from its original source.

In another embodiment, each sensor node can store location information about itself, such as its current location. When a message is originated, it can include the location at which it was originated. When the message is forwarded, to another sensor node, it can compare its location to the location in the message and calculate distance. The sensor node can be configured to only forward the message to other sensor nodes in the sensor net if the distance is below some cut-off value.

In some embodiments, some sensor nodes in a sensor net can be configured to detect information and forward it to other sensor nodes but not broadcast the information to portable devices. For example, if the parking sensors around a city block are organized in a block sensor net, it may be sufficient to only broadcast parking information from the parking sensor nodes at the corner. The other parking sensor nodes in the block sensor net can be configured to only detect and send information to the corner nodes in the block sensor net, but not broadcast this information in a manner that allows it to be necessarily received by a portable device, such as 201. If one of the corner nodes stops broadcasting, then the block sensor net can be configured to detect this event and reconfigure another parking sensor node to act as a 'spokesman' for one or more nodes in the block sensor net. In another example, the parking sensor nodes can range can overlap sufficiently that it makes sense to alternate which nodes broadcasts the available parking information for the block sensor net. This type of scheme may be useful as a power saving measure.

In general, sensor nodes can be configured to route information to base stations. Information can be forwarded to a base station through one or more sensor node hops. The sensor node can comprise logic that allows it to route the information so that it is received at a base station. Also, sensor nodes can be configured to propagate information within the sensor net. When a sensor node receives a message from another sensor node, the sensor node can be configured to determine whether to forward it or not to other sensor nodes. As described above, propagation of information in sensor net can be limited by applying a limiting criterion, such as limiting a number of hops a message can be forward or by limiting an actual distance that the messages travel by comparing a current location of a sensor node receiving the message with a location at which the message was originated.

In addition, sensor nodes can be configured to receive information detected at other sensor nodes and then broadcast this information. Thus, a sensor node can be configured to broadcast information it has detected as well as information that other sensor nodes has detected. Thus, when a sensor node receives information from another sensor, it can be configured to determine whether the information is new or not. As information is propagated through a sensor net, it can be possible that a sensor node receives an identical message from different nodes. When the sensor node receives a message it can determine the node from which it was sent and check whether it currently store any information concerning this node. When the sensor node determines that it does not store any information concerning the node identified in the message, it can store the information and possibly begin broadcasting information associated with this node. When the sensor node determines, it already has received the information associated with the node, it can be configured to ignore the message.

Prior to broadcasting the information it has received from another sensor node, a sensor node can be configured to check how far away the message originated. When the distance is above some cut-off value, the sensor node can be configured to not broadcast information contained in the message. Also, the sensor node can be configured to associate a broadcast life-time with information. For instance, when a message is generated and sent out from a sensor node, it can include a time at which it was generated. A sensor node receiving this message can be configured to only broadcast the information in the message for some period based upon the time that the message was originated. Also, the sensor node can be configured to periodically perform status checks on the information it is broadcasting and stop broadcasting information after a certain time period based upon when a time that the information was originated.

Finally, information broadcast by a sensor node from another sensor node can become inaccurate when a status change occurs. For instance, a first sensor node, such as 222, can detect an existence of an available parking space and its location. Then sensor node 222 can send out this information to other sensor nodes in the sensor net, which then begin broadcasting this information. For instance, sensor node 225 can begin broadcasting this information. At a later time, the sensor node 222 can detect that the space is now occupied. The sensor node 222 can send out a message indicating the status change to other sensor nodes in the sensor net. In response to receive this message, sensor nodes, such as 225, can stop broadcasting the information received from sensor node 222 regarding the available space.

Thus, in general, a first sensor node can be configured to receive a first message from a second sensor node and begin broadcasting information received from the second sensor node. Then, the first sensor node can be configured to receive a second message from the second sensor node that contains new information. In response, the first sensor node can be configured to stop broadcasting information associated with the second sensor node or it can be configured to replace the information previously received from the second sensor node and begin broadcasting the new information.

The city services data warehouse 204 can be gathering information from multiple sources distributed throughout a city. For instance, the city services data warehouse can be storing gathered from multiple sensor nets in formatting it in a manner that allows it to be accessible. In a particular embodiment, the date warehouse 204 can be receiving transportation related information from multiple sources, such as busses, trains, bikes, car-share vehicles, taxis and ferries. The data warehouse can be in communication with mobile devices, transportation kiosks and sensor nodes to provide transportation information that is relevant to a particular location.

As an example, a sensor node or transportation kiosk located at bus stop can be configured to communicate with the data warehouse 204. The data warehouse 204 can be receiving information, such as location information from busses throughout the city. The date warehouse 204 can be configured to determine based upon the location of sensor node and/or route data associated with the bus stop information that is relevant to the bus stop and then send this information to the sensor node and/or transportation kiosk at the bus stop so that it can be broadcast via the sensor node and received via mobile devices that within broadcast range of the sensor node located at the bus stop.

Besides relevant bus data, the data warehouse 204 can determine transportation information for multiple transportation modes that are available proximate to the bus stop. For instance, the data warehouse 204 can be receiving information related to trains, taxis and bikes throughout the city. Based on the location of the bus stop, the data warehouse can be configured to determine transportation information that is relevant to the area proximate to the bus stop. This information can be sent to the bus stop and broadcast via a sensor node or transportation kiosk located at the bus stop. Using this information, a user of a mobile device executing a transportation application can use the transportation application to formulate a transportation solution.

In another embodiment, the data warehouse 204 can be configured to receive location information from a mobile device, such as 201. The mobile device 201 can determine location information from a satellite system, such as GPS, cellular information such as location information from a cell tower which the mobile device communicates and/or can be based upon information gathered by the mobile device from one or more sensor nodes. In response to receiving the location information, the data warehouse can provide information regarding one or more transportation modes that are relevant to the location provided by the mobile device 201.

The mobile device 201 can be configured to request information related to particular transportation modes, such as taxis or bikes. If the request sent by the mobile device 201 is only for particular transportation modes, the data warehouse can be configured to only provide information in response that is relevant to the requested transportation modes and send this information to the mobile device.

The mobile device 201 can receive information from the data warehouse 204, such as but not limited to locations of local transportation modes, availability of the transportation mode, such as a bus is approaching in 5 minutes, and rate information. This information can be output by the mobile device 201 in a manner that allows a user to make an informed transportation decision. For instance, the mobile device can highlight the location of a bus stop, a user's current position and information indicating a bus is approaching in five minutes, a location of a train station and information that the next train arrives in 10 minutes.

The mobile device, such as 201, can include components such as but not limited to one or more local communication interfaces, such as a local communication interface 212, a remote communication interface 214, audio components, such as a microphone/speaker 220, a memory storing applications, such as 220, a camera 216, a GPS receiver, a CPU 222, additional memory 218 and a display 210. The remote communication interface 214 can be configured to allow the mobile device access an available cellular and data network. The local communication interface can be configured to allow communication with local devices, such as sensor nodes and base stations. One local communication interface can be Wi-Fi and another is Bluetooth.™ In particular embodiments, the local communication interface can allow communication with devices, such as sensor nodes, using Zigbee, which implements an IEEE 802.15.4 communication standard. More details of sensor nodes are described with respect to FIG. 3.

Mobile device 201 includes camera 216. Camera gathered information can be used as part of the transactions described herein. For instance, as part of a parking transaction, previously described, a user can take a picture of a parking space number, such as a stall number. Further, the user can take a picture of a vehicle license plate or other unique vehicle identifier. For instance, a symbol, such as a bar-code can be placed inside of a vehicle and user can take a picture of this bar-code as part of a parking transaction. In another embodiment, a user can be requested to take a picture of the user's face or the user's hand as part of a transaction. This information can provide a biometric record that is used to authorize or later dispute a transaction.

Information gathered mobile device, such as but not limited information gathered from the camera 216, GPS 218, cell phone tower information and information received from sensor nodes can be sent by the mobile device 201 to the city transactions server 202 to initiate a transaction. The mobile device 201 can communicate with the city transactions server via the local communication interface 212. The city transaction server 202 can be configured to provide transactions in multiple areas through out a city. Some previously described transactions that can be initiated include but are not limited to a transaction involving a purchase of parking or transportation.

As part of the transaction, the city services transaction server can send an electronic receipt as described with respect to FIG. 1. In one embodiment, the electronic receipt can be a bar-code or other symbol that can be displayed on the display 210 of the mobile device or another display device. The bar-code can be used to gain access to services associated with the transaction, such as bus or train access.

In other embodiments, the electronic receipt can include an electronic token. The electronic token can be transmitted from the mobile device 201 to an e-token device 230, such as an E-token located in a user's car. The e-token device 230 can include a radio transceiver configured to output information associated with a stored electronic token. Also, the electronic token can be stored on the mobile device 201 and transmitted to other devices as needed. For instance, the mobile device 201 can receive an electronic token usable for bus fare that can be detected/received by a device located on the bus. Electronic tokens can be used as part of various enforcement and access schemes, such as a parking enforcement or transportation access.

Sensor Nodes

Figure 3:
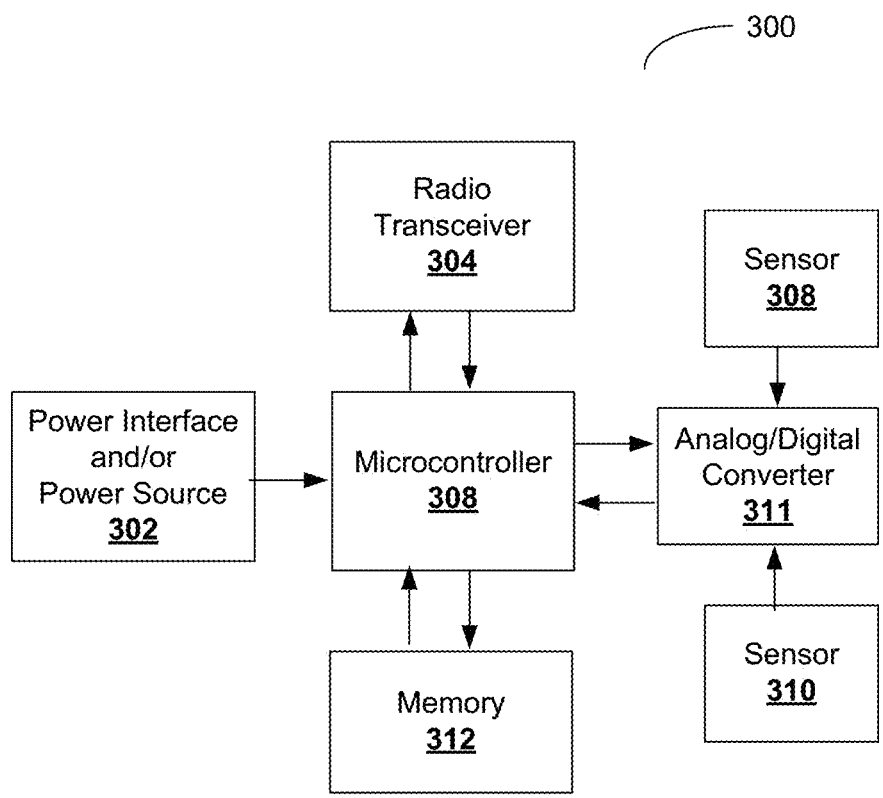
FIG. 3 is a block diagram of a sensor node for one embodiment of the present invention.

FIG. 3 is a block diagram of a sensor node 300 for one embodiment of the present invention. In one embodiment, the sensor node 300 can comprise a power interface and/or power source 302, a radio transceiver 304, a microcontroller 308, a memory 312, one or more sensors, such as 308 and 310, and an analog to digital/converter 311. The sensor node can include an internal power source, such as a battery or a capacitor, and/or can be connected to an external power source, such as power generated from an electric grid or power that is harvested from an environmental source, such as solar power, vibrations or an ambient heat source. The batteries can be rechargeable Power consumption in the sensor node can be used for the sensing and communication and data processing. More energy can be required for data communication in sensor node as compared to sensing and data processing. Two power saving methods that can used are Dynamic Power Management (DPM) and Dynamic Voltage Scaling (DVS). DPM takes care of shutting down parts of sensor node which are not currently used or active. DVS scheme varies the power levels depending on the non-deterministic workload. By varying the voltage along with the frequency, it is possible to obtain quadratic reduction in power consumption.

The Microcontroller 308 performs tasks, processes data and controls the functionality of other components in the sensor node. Other alternatives that can be used as a controller include but are not limited to: a general purpose desktop microprocessor, digital signal processors, field programmable gate arrays and application-specific integrated circuits. The microcontroller can implement an Operating System (OS), such as TinyOS.

TinyOS is based on an event-driven programming model instead of multithreading. TinyOS programs can be composed into event handlers and tasks with run to completion-semantics. When an external event occurs, such as an incoming data packet or a sensor reading, TinyOS calls the appropriate event handler to handle the event. Event handlers can post tasks that are scheduled by the TinyOS kernel some time later. Both the TinyOS system and programs written for TinyOS are written in a special programming language called nesC which is an extension to the C programming language. NesC is designed to detect race conditions between tasks and event handlers.

Sensors, such as 308 and 310, can be hardware devices that produce measurable response to a change in a physical condition like temperature and pressure. Sensors sense or measure physical data of the area that is to be monitored. The continual analog signal sensed by the sensors can be digitized by an Analog-to-digital converter, such as 311, and sent to controllers for further processing. Information generated from the sensors can be stored in memory 312.

Sensors can be passive and non-directional, directional or active. Passive sensors can sense the data without actually manipulating the environment by active probing. These sensors can be self powered, i.e., energy is needed only to amplify their analog signal. There is no notion of "direction" involved in these measurements. Passive, narrow-beam sensors are a type of passive but they have well-defined notion of direction of measurement. A typical example of a passive directional sensor is a camera. Active Sensors can actively probe the environment. A sonar or radar sensor is an example of an active sensor.

In particular embodiments, sensor nodes can include environmental sensors for measure ambient conditions, such as temperature and pollutions levels. A parking sensor node can include both parking related sensor and environmental related sensors. Thus, a parking sensor can also be used to monitor city environmental conditions, such as pollution levels.

Sensor nodes can make use of ISM band which gives free radio, huge spectrum allocation and global availability. Some choices of wireless transmission media include radio frequency, optical communication (Laser) and infrared. Laser requires less energy, but needs line-of-sight for communication and also sensitive to atmospheric conditions. Infrared like laser, needs no antenna but is limited in its broadcasting capacity. Radio Frequency (RF) can be based upon frequencies between about 433 MHz and 2.4 GHz. The functionality of both transmitter and receiver are can be combined into a single device know as transceiver, such as 304. The transceiver can utilize a communication protocol, such as ZigBee, WirelessHART, or 6lowpan/ISA100. These protocols all are based on the same underlying radio standard: IEEE 802.15.4-2006.

Zigbee can utilize 2.4 GHz, 902-928 MHz and 868-870 MHz communication bands. The 2.4 GHz band is used worldwide and has 16 channels and a maximum over-the-air data rate of 250 Kbps. Lower frequency bands are also specified. The 902-928 MHz band serves the Americas and much of the Pacific Rim, with 10 channels and a burst rate of 40 Kbps. European applications use one channel in the 868-870 MHz band, Which provides 20 Kbps burst rate. This assortment of frequencies lets applications with the appropriate hardware configuration adjust in real time to local interference and/or propagation conditions. Once on a specific channel, the 802.15.4 radio relies on a number of mechanisms to ensure reliable data transmission, including binary phase shift keying (BPSK) in the 868/915 MHz bands and offset quadrature phase shift keying (O-QPSK) at 2.4 GHz.

ZigBee relies on the basic 802.15.4 standard to establish radio performance. As a short-range wireless standard, 802.15.4 excels in the ultra-long battery life and low transmitter power. The standard specifies transmitter output power at a nominal −3 dBm (0.5 mW), with the upper limit controlled by the regulatory agencies of the region in which the sensor is used. At −3 dBm output, single-hop ranges of 10 to more than 100 in are reasonable, depending on the environment, antenna, and operating frequency band. Instead of pure power, ZigBee augments the basic 802.15.4 simple transmitter and protocol with an extensible, sophisticated network function that allows multi-hop and flexible routing, providing communication ranges that can exceed the basic single-hop. Indeed, depending on the data latency requirements, networks that use dozens of hops, with cumulative ranges in the hundreds to thousands of meters. Networks can have star, cluster tree, or mesh structures; each comes with its own strengths.

Various security schemes can be incorporated with the sensor nodes and networks described herein. IEEE 802.15.4 provides authentication, encryption, and integrity services for wireless systems that allow systems developers to apply security levels as required. These include no security, access control lists, and 32-bit to 128-bit AES encryption with authentication. This security suite lets the developer pick and choose the security necessary for the application, providing a manageable tradeoff against data volume, battery life, and system processing power requirements. The IEEE 802.15.4 standard doesn't provide a mechanism for moving security keys around a network. The ZigBee security toolbox consists of key management features that let you safely manage a network remotely.

A parking sensor is one example previously described with respect to FIGS. 1 and 2. In reference to FIG. 3, the parking sensor can comprise one or more sensors to detect the presence of a vehicle in one or more embodiments. The sensor node 300 can include a body or casing of some type (not shown). The sensor, such as 308 and 310, can be secured to the body of the parking sensor in various ways. For example, the sensors can be attached to the exterior surface of the body or may be embedded into exterior surface of the body. In some embodiments, the sensors can be embedded or attached such that a portion of each sensor protrudes or is external to the exterior surface of the body. In other embodiments, the sensors can be secured internal to the body (i.e. held within the body) such that no portion of a sensor is exposed. It is contemplated that individual sensors can be secured by various structures, mounts, fasteners, adhesives, or a combination thereof. In one embodiment, the sensors can be secured by a rotating or pivoting mount which the sensors to be pointed in a particular direction or angle.

The sensors of parking node sensor can detect the presence of an object within a parking space by emitting one or more detection beams which may comprise acoustic, electromagnetic, radio frequency, or light (including non-visible, such as infrared heat) energy. The beams can be directional or omni-directional. A logic device, such as 308 can be used to determine the presence of a vehicle within a parking space based on the detection of one or more objects by the sensors, such as 308 or 310. Generally, the reflection of a detection beam off an object can allows the sensors to detect the object's presence. It is noted that detecting an object can include detecting the presence of a motor vehicle or parts thereof as well as detecting the presence of other physical objects. In addition, one or more of the sensors can be passive sensors which detect vehicles without emitting any detection beams.

In a particular embodiment, the sensors 108 can be acoustic sensors which detect the sound of a vehicle, or the sensors may be radio frequency or electromagnetic sensors which detect changes in surrounding radio or electromagnetic energy due to the presence of metals or other materials in a vehicle. The passive sensors can also detect physical contact or movement, such as physical contact with a vehicle or movement of the pavement (including pressure) due to the presence of a vehicle. The passive sensors can also detect the weight of a vehicle in one or more embodiments.

It is contemplated that any type of sensor, now known or later developed, which is capable of detecting the presence of an object can be used. In addition, one or more different types of sensors can be used on a single sensor node, such as parking sensor node, if desired. The ability to have multiple types of sensors can be advantageous in that readings from the various types of sensors can be used to verify the presence of a vehicle such as by comparing the readings from the various sensors. As is known in the art, different types of sensors can have different detection ranges and capabilities and may be chosen to suit different environments, vehicles, or other conditions.

Interactions Among System Components

Figure 4:
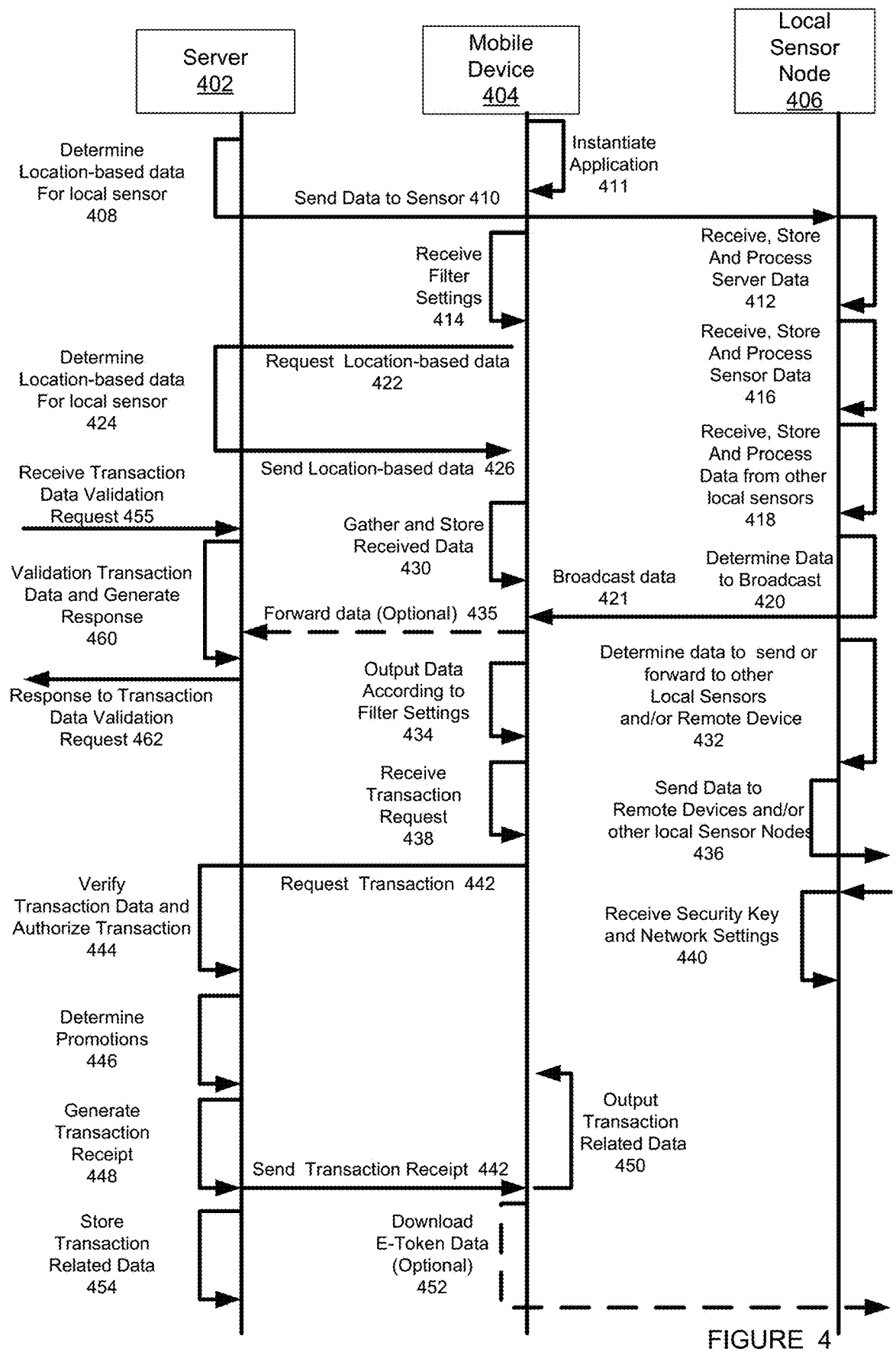
FIG. 4 is an interaction diagram comprising a sensor node, a server and a mobile device.

FIG. 4 is an interaction diagram comprising a sensor node 406, a server 402 and a mobile device 404. In various embodiments, one or more servers can be employed to implement various functions described herein and the present invention is not limited to a single server. For example, one server can be configured to perform transactions, disseminate location relevant information to various sensor nodes and gather/store data from various sensor nodes. In another embodiment, these functions can be performed by separate servers. In other embodiments, a single function can be implemented using multiple servers. For instance, multiple servers can be dedicated to performing a single function, such as parking transactions. Thus, the following description is not meant to be limiting to a particular architecture and is provided for illustrative purposes only.

As previously described, a local sensor 406 can act in a stand-alone mode. In a stand-alone mode, the local sensor can be configured to process data from one or more sensors and broadcast information about the sensor data it has collected. It can also be configured to broadcast information about its position. The information can be its actual position or an identifier associated with the sensor node where a record indicating the sensor node's position can be accessed via the identifier. The position information can allow another device, such as the mobile device 404 to determine its position. For instance, the mobile device can be configured or a device in communication with the mobile device can be configured to determine a location of the mobile device by analyzing position data that the mobile device has received from multiple sensor nodes. An advantage of this approach is that can work indoors, such as in a parking garage where GPS signals are not available.

In other embodiments, rather than broadcasting information, the local sensor node 406 can be configured to send information to specific devices in a network of devices associated with the sensor node. In various embodiments, the local sensor node can be configured to send information to other local sensor nodes, mobile devices, such as 404 and remote devices, such as server 402. In some embodiments, information addressed to a particular device can be sent indirectly through multiple intermediary devices. For instance, information detected by local sensor node 406 can be sent to a remote server, such as 402, via one or more hops involving other sensor nodes or even a mobile device, such as 404, acting as a temporary node. In 432, the local sensor node can determine data to send or forward to other local sensor nodes, mobile devices and/or remote servers. In 436, the local sensor node 406 can send data to remote devices, such as 402 or 404, and/or other local sensor nodes.

As described in the previous paragraph, the mobile device 402 can be configured to act as a temporary node in a network. The mobile device 402 is referred to as a temporary node because as it travels through a particular area, it can move in and out of communication range with various sensor nodes. Nevertheless, when in range of a particular sensor node or having previously been in range of the particular sensor node, it can be used to send information received from the particular sensor node, while it was in range, to a remote device, such as server 402. In 435, the mobile device 404 forwards information to the server 402. This information can have been received from the local sensor node 406 in 421 as broadcast information. In other embodiments, the mobile device 404 can forward information to the server as part of a transaction request. For example, data gathered from one or more local sensor nodes can be sent as part of a transaction request 442 sent from the mobile device 404 to the server 402 where all of the data sent in the transaction request may not be related to the transaction, i.e., extra data can be piggy-backed on the transaction.

In a particular embodiment, the local sensor node 406 can be configured to broadcast extra information that is not output by an application running on the mobile device but is still being detected by mobile device. For instance, a local sensor node, such as 406, can be configured to detect local environmental conditions, such as air quality, as well as to detect available parking. The local sensor node can broadcast information about the parking and the environmental information where the environmental information can be piggy-backed to the parking information. The application running on the mobile device can be configured to process both sets of information, output the parking information, which is of interest to the user and forward the environmental information to a remote device, such as server 402, which can be of interest to other users, such as a local government. While the parking application is running on the mobile device 404, the user of the application may not be aware that their mobile device is being used to process and forward the information related to the environmental conditions.

In other embodiments, an application instantiated by the mobile device 402, such as the application instantiated in 411, can be configured to broadcast information that can be received by local sensor nodes, such as 406, that it is available for communications. This application, such as a parking or transportation application, can have been downloaded to the mobile device 404 from a remote device, such as server 402. The local sensor node, such as 406, can be configured to detect the presence of a mobile device that is available and establish a communication link with the available device. Then, the local sensor node 406 can be configured to determine a package of information to send to a remote device, such as the server 402 via the mobile device 404 and send it. This process can be going on in the background and a user of the mobile device may not be aware that these communications are occurring. A local government may strike to a deal with local network providers that allows information of this type to be sent for free, so that an owner of the mobile device 404 is not charged for allowing their mobile device to be used in this manner.

When the local sensor node 406 is configured to use a mobile device 404 as a temporary network node, the local sensor 406 can be configured to develop a queue of information for transmission to a remote device via the temporary node. This queue can be built up while the local sensor node is waiting for temporary node to come into range. When an available temporary node is detected, the local sensor node 406 can be configured to send some or a portion of information it has accumulated in its queue to the temporary node, via one or more communications, with the temporary node.

Returning to FIG. 4, as previously described the local sensor node 406 can be configured to receive data from various sources. For instance, in 408, a remote device, such as server 402 can be configured to determine location-based data that is appropriate to a local sensor node, such as 406. The location based information can be information that can be of interest to a user of a mobile device, such as 404, that is in communication range with the local sensor node, such as 406. For example, a local sensor node located at a bus stop can be configured to receive bus status information from a remote device, such as 402. In 410, a remote device, such as server 402, can send data, such as location-based data to a local sensor node, such as local sensor node 406 for broadcast purposes.

In 412, the local sensor node can receive, store and/or process data sent from a remote device, such as server 402. In 416, the local sensor node 406 can receive store and/or process data from one or more sensors associated with the local sensor node (e.g., see FIG. 3). In 418, the local sensor node 406 can receive, store and/or process data from other local sensor nodes. Although not shown, the mobile device 404 can also send data to the local sensor node 406. In 420, the local sensor node can be configured to determine whether to broadcast information that it has received from one or more of its sources, such as the remote server 402, other local sensor nodes, its own sensors and mobile devices, such as 404. The determination can involve such factors as checking the integrity of the data and determining whether the data is currently relevant for the particular time and location of the local sensor node.

After a determination is made to broadcast information, it can be formatted and broadcast in 421. In some embodiments, all or a portion of the broadcast data can be encrypted. For instance, piggy-backed data can be encrypted while non-piggy backed data might not be encrypted. To allow for encryption, the local sensor node 406 can be configured in 440 to receive security key and other security related information as well as network setting from a remote device, such as but not limited to server 402. The network setting information can comprise but is not limited to information, such as one or more local sensor nodes that can be used as an intermediary device to send information.

As described above, the local sensor node can be configured to receive information from multiple sources. All or a portion of this information can be broadcast by the local sensor. In other embodiments, all or portion of the information received in 412, 416 and 418 can be sent/forwarded to other devices. In 432, the local sensor 406 can determine data to send or forward to other local sensors and/or remote devices. For instance, the local sensor node can be figured to send, via one or more intermediary devices, data it has collected from its sensors. In one embodiment, data can be uploaded for archival purposes and then later deleted from the local sensor node. The local node can also act as an intermediary device. In 436, it can send data to other remote devices, such as but not limited to other local sensor nodes, mobile devices, such as 404 and remote devices, such as 402.

In 411, the mobile device 404 can instantiate an application, such as a parking locator application or a transportation application, that allows it to receive data from one or more local sensor nodes, other mobile devices, remote devices, such as server 402 and combinations thereof. The communication can be a direct communication between the mobile device and local sensor node. For example, in 421, the mobile can receive location based data broadcast from one or more local sensor nodes, such as 406, in communication range with the mobile device. In another example, the mobile device 404 can be configured to receive location based data gathered from other mobile devices that are in communication range of the mobile device 404, i.e., located within some proximate area. Thus, in some embodiments, mobile device 404 can be configured to share location based information with other mobile devices in the area.

In another example, mobile devices, such as 404, can be configured to receive location-based information and other types of information from a remote device, such as server 402. In one embodiment, this information can be sent to the mobile device in response to a request for location based data sent to the remote device, such as server 402, from the mobile device in 422. In some instances, the mobile device can forward the location related information it has gathered and the determination of its location can be made or verified by the remote device, such as server 402.

In another embodiment, in a peer-to-peer network configuration, the mobile device can be configured to request location-based information from other mobile devices that are in range of the mobile device 404. The request can include a location of the requesting mobile device, such as a location determined from GPS data, cell data, local sensor node data or combinations thereof. In 422, the request can also include requests for specific types of data, such as merchant data or transportation data. The mobile device can include an interface for selecting specific types of data to gather from remote sources, such as the server 402 or the local sensor node 406 and specific types of data to output. The selections of the data that is gathered and the data that is output do not have to be the same. In 414, these selection can be input as filter settings related to data gathering and data output.

In 424, the remote device, such as server 402, can determine appropriate location-based information and, in 426, send it to the mobile device 404. The remote device, such as 402, that is providing the location-based information can contact one or more other devices to gather information. For instance, particular servers can store information related to specific types of information, such as transportation, local services and local merchants, and the remote device can be configured to contact one or more of these other devices to gather needed information and then forward it to the mobile device requesting the information.

In one embodiment, the information sent to the mobile device 404 in 426 can include location-based promotions or advertising. For instance, the server, in 446, can be configured to determine that a merchant within some distance of the location determined for the mobile device 404 is offering a promotion and send data that allows information about the promotion to be output at the mobile device, such as outputting information about the location of the promotion and its nature to a display. Filter setting input by the user in 414 can be used to determine whether promotions/advertising are sent to the mobile device or not, types of promotions that are sent to the mobile device and/or whether promotions are output. In other embodiments, the application instantiated by the mobile can be configured to output certain information, such as promotions and advertising independent of a user's wishes specified by their filter settings.

In 430, the mobile device can gather and store received data. The received data can be from remote devices, such as server 402, local sensor nodes, such as 406 and other mobile devices. In 403, the mobile device can be configured to store data not specified by current fitter settings to allow for this data to be retrieved at a later time if the filter setting input in 414 are changed.

In 434, the mobile device can be configured to output one or more different types of information. This information can be output according to the filter settings received in 414. For instance, the mobile device can be configured to receive information about an available parking space and output directions from the current location of the mobile device to the location of the available parking space. The information can be output in a visual format, an audio format or combinations thereof. As another example, the mobile device can receive information about a sale at a particular merchant and provide directions from the current location of the mobile device to the merchant location. If the mobile device user was in a car, the mobile device could be configured to provide directions to the nearest available parking relative to the merchant location.

In one embodiment, the mobile device can be configured to store information according to location. For instance, information that is gathered can be stored according to locations along a route that the mobile device has traveled. In some embodiments, this route based information can be sent to or shared with other devices. For instance, a first user can find all of the merchants of a specific type along a particular route using a first mobile device and then forward this information to a second mobile device where a second user of the second mobile device can then follow the route provided by the first user. The second user can also utilize the information gathered by the other user, such as available sales or promotions related to the merchants. As another example, a user of a first mobile device can provide air qualities reading along a certain route and then forward them to a second mobile device. The user of the second mobile device can then decide to follow or not to follow the route provided by the first user based upon the air quality readings.

Mobile devices, such as 404, can be used to perform various transactions. For instance, a mobile device can be used to purchase parking or transportation access. In 438, the mobile device can receive an input indicating a request for a transaction, such as a transaction to purchase parking. In 442, a mobile device, such as 404, can be configured to send the transaction request to a remote device, such as 402. In 444, the remote server can verify transaction data and authorize the transaction. The verification and authorization can include locating an account associated with the transaction, determining whether the account is valid, verifying financial information, verifying location information (e.g., if the transaction is location specific, it can be desirable to verify that a correct location for the location has been determined), verifying identification information that can associated with an account, such as a PIN or a password, deducting funds for the transaction from an account or receiving an authorization from a remote account, requesting and verifying biometric information, such as a photo of the user, requesting other verification information, such as a current picture of a car's license plate. Thus, in 444, multiple communications can occur between the mobile device and the server 402.

One advantage of using a mobile device to perform a transaction in the manner described above is related to user privacy. In the methods described herein, the mobile device can be used to gather data from one or more local sensor nodes without its location being revealed. As previously described, the mobile device can be utilized in a moving vehicle to obtain parking. In the case of parking, the location of the mobile device may not be revealed until the user wishes to perform a transaction. Otherwise, the position of the mobile device of the user can remain undetected and the user can travel unmonitored. This approach differs from other methods where the car includes an identifier, such as a transponder or a GPS tracker that allows its position to be constantly monitored.

In 446, the server 402 can determine whether there are any promotions or advertising to be added to the transaction. For instance, a promotion can be associated with the nature of the transaction, such as free parking for a parking transaction, or can be associated with the transaction information, such as a location of the mobile device that is initiating the purchase. In 448, a transaction receipt can be generated, the transaction receipt can include information, such as a unique identifier e.g., an e-token), that can be used to validate and possibly enforce conditions associated with the transaction. The transaction receipt can also include unique identifiers associated with a promotion. The transaction receipt can be sent to the mobile device in 442. In 450, the mobile device can be configured to output transaction related data, such as a confirmation of the transaction and promotions/advertising sent with the transaction receipt.

In 454, information related to the transaction can be stored for dispute resolution as well as transaction enforcement. For instance, an electronic token can be associated with a transaction, such as a purchase of parking and sent with the receipt in 442. This electronic token can be a unique number or a unique symbol associated with the transaction, which in some instances can be sent as an image. In 452, the e-token information can be downloaded to a device separate from the mobile device, such as wireless transceiver located in a car, a display located within a car or a printer associated with a kiosk where the e-token information is output to a printed ticket. E-token information can then be read from another device.

E-token information can be sent to a remote device, such as 402, storing transaction information. In 455, the remote device, such as 402, can receive a request to validate transaction information. In 460, the remote device can validate the transaction information and generate a response. For instance, the remote device can determine whether information regarding an e-token is associated with a valid token issued by the server. Then, the server can check whether conditions that can have been associated with the token when it was issued are still valid. For instance, a token can have been issued that is only valid for a certain time period. Thus, the server can check whether the token has expired. As another example, a token can issued that is only valid in a particular area or location and the server can be configured to determine whether a device associated with the e-token is at a valid location. In yet another example, an e-token valid for a promotion, such as a discount at a merchant, can be valid for only a single use and the server can check whether the e-token is valid and whether it has been redeemed yet. In 462, a response to a requesting device can be sent in regards to the validity of a token. Further details of promotions and other rewards that can be used to influence parking behavior are described with respect to FIGS. 5 and 6.

Dynamic Parking Policies via Rewards Programs

Typically, as part of a parking policy, cities provide rules that govern the utilization of the parking space commodity with the city. The rules in the parking policy attempt to balance stakeholder interests that are affected by the utilization of the parking space commodity. The stakeholders can include individuals, such as but not limited to 1) residents, 2) workers and visitors that utilize the parking spaces, 3) merchants and service providers whose businesses are affected by access to parking and 4) city managers that use parking revenue to generate city services. The parking policy can include penalties, such as fines, for not following the parking rules, which are typically enforced by a workforce associated with the city government.

Currently, parking policy implementation mechanisms don't provide methods or apparatus for determining for what purposes parking is being utilized. The purposes can include activities in which an individual is engaged while they are utilizing a parking space. If an individual's activities while utilizing parking resources can be determined, then parking related rewards can be provided that incentivize parking use behaviors deemed beneficial to one or more of the parking stakeholders. A parking system including rewards based on an individual's activities are described with respect to the following paragraphs. The rewards can be used to incentive desirable parking use behaviors and improve satisfaction of individuals using city parking services including street parking.

Figure 5:
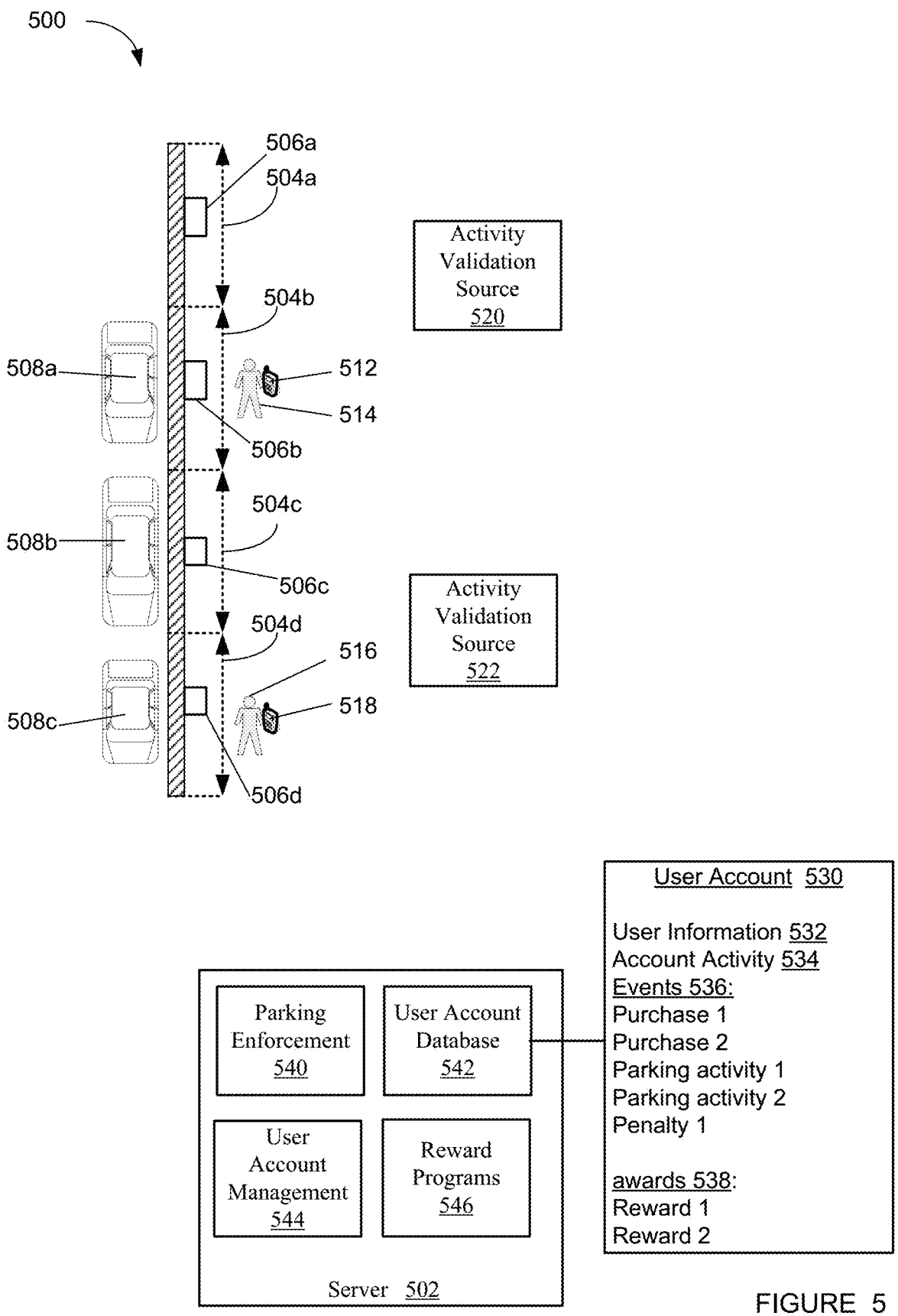
FIG. 5 shows a block diagram of a parking system 500 that allows individual parking behaviors to be tracked and incentivized.

FIG. 5 shows a block diagram of a parking system 500 that allows individual parking behaviors to be tracked and incentivized. First, a description of a user account that can be used as part of a parking rewards program is described. In particular, account components and system functions are described. Then, example interactions between device components in the system where parking rewards are provided are described.

Individuals using the parking system 500 can be provided accounts, such as user account 530. The user account 530 can be associated with a particular account identifier. Further, the account can include user information 532 particular to the individual or individuals associated with the account. For instance, the user information can include personal identification information, such as a user's name and address. In addition vehicles can be registered with the account. Thus, the user information 532 can include vehicle information, such as vehicle license plate numbers, a make and model of a vehicle and a color of a vehicle.

In some embodiments, as described above, transmitting devices can be used within the parking system. For instance the transmitting devices can be placed in vehicles. The transmitting devices can be configured to display or broadcast information associated the parking system, such as information related to an electronic parking token stored within the transmitting device and/or unique identifying information associated with the transmitting device. The electronic parking token can be associated with a purchase of parking. In particular embodiments, a number of the transmitting devices can be associated with a user account, such as 530. For instance, information about each of the transmitting devices, such as a unique identifier that the transmitting device broadcasts, can be stored to the user account 530 as part of the user information 532.

In yet other embodiments, the system 500 can be configured to allow a user to register electronic device information with the account 530, which can be stored as part of the user information 532. The electronic device can be a device regularly used by the user associated with the account, such as a smart phone, tablet computer, laptop or desktop computer. The electronic device information can include a unique identifier associated with the device, such as a MAC address or identifying information stored on a SIM card. In some embodiments, the system 500 can be configured to only accept and store transactions and activity information from an electronic device when the electronic device is registered with the user's account. Further, the system 500 may be configured to only allow account access, such as access from a user wishing to check their account activity, from particular electronic device.

The user account information 532, such as the account identifier, the user information, the vehicle information, transmitting device information (i.e., devices that can be placed in a vehicle) and the electronic device information (i.e., devices that can be utilized by an account holder to transmit data to and access the account) can be generated and entered when the user registers for an account. After registration, the system can be configured to allow the user to view the user account information 532, make changes to the account 530 and view account activity 534. The user accounts can be hosted on a device, such as server 502. The user account management 544 application on server 502 can be configured to provide interfaces, such as web-based browser interfaces, that can be used for the initial account registration, viewing and modifying account information and viewing account activity.

After an account, such as 530, has been instantiated on server 502, a number of events 536 can be posted to the user account. Different events can include but are not limited to purchases of parking, other types of purchases, parking activities and penalties. Based upon the rules of the rewards program, the events can result in awards being earned by an account holder. In particular embodiments, a record of each award can be stored to the user account. Further, details of these events are described with respect to the following paragraphs.

The types of purchases tracked by system 500 can depend on the sponsor of the rewards program and thus, can change over time. One example of a sponsor of the rewards program is a city government. Another example of a sponsor of the rewards program can be an individual merchant or service provider or a group of such entities. These entities may be interested in purchases of their merchandise and/or services. Based upon the merchandise and/or service purchases by a user associated with user account, such as 530, the system 500 can be configured to provide awards, such as but not limited to parking credits and/or parking discounts.

One example of a purchase that can be tracked is a purchase of parking by the account holder of account 530. As described above, an electronic parking token can be generated that is associated with the purchase of parking. Based on the one or more purchases, a city government can reward individuals for utilizing city parking services. In yet another example, a purchase of another city transportation service, such as a bus fare or a train fare, can be stored to the user account 530. In this embodiment, the city may wish to track bus fare and train fare purchases and based upon the purchases award the individual with free or discounted parking. In one embodiment, the reward criteria can be based upon how frequently a user purchases public transportation relative to purchasing parking. In another embodiment, the reward criteria can be based on an amount of money spent on public transportation or a number of trips purchased on public transportation.

An individual that uses public transportation instead of driving reduces congestion with the city. However, the individual may still occasionally wish to park within the city. An award of parking credits or discounted parking can be used to incentivize users to mostly use public transportation and only occasionally drive and park within the city.

In one embodiment, one or more rewards programs can be instantiated in the system 500 at a time and a user can participate in one or more reward programs simultaneously. For instance, different groups, such as groups of merchants can enter into an agreement with the city to sponsor different parking based rewards programs. As is described in more detail with respect to FIG. 6, in some embodiments, the rewards programs can be based upon activities that occur within a specific zone of the city. Thus, as a user may earn credits or points for different rewards programs as they participate in activities in different locations throughout the city. The bookkeeping for the different rewards programs can be provided via the rewards program application 546 on server 502.

In one embodiment, the system 500 can be configured to determine a point value for each event. For instance, an event involving a purchase of parking can earn points. The amount of points can depend on the purchase amount or can be a fixed value. Point values for other events, such as validated activities that occur while a user has purchased activities, can be determined by the system. The user account 530 can be configured to display event information 536 including points earned for each event and point totals.

In addition, award points may be given to customers where no customer activity is required. For example promotions where 100 points are given to new customers, 250 points might be given to customers who exceed certain thresholds in a given month and 50 bonus points may be given to customers who sign up 1 new customer in a week, i.e., refer a friend. A variety of other scenarios where points are given to customers include bonus or promotion events to encourage patronage or encourage sign up. There may even be points given to customers who have used no services in order to encourage them to start using city transportation services. A customer may also purchase points in order to achieve a given point amount for an award or service of interest.

In one embodiment, the system 500 can be configured to automatically credit awards, such as 538, when certain point thresholds are reached. For instance, a parking credit for an hour of free parking can be credited to a user account when a certain point threshold is reached and the used points can be deducted from the system. In another embodiment, the system 500 may allow the user to select the awards based on their point totals and then, deduct the used points from their user account 530. For instance, the system 500 can be configured to allow a user to convert their points to a free hour of parking or pay-off or partial pay-off a parking violation using points.

When a merchant or a service provider participates in a rewards program, their customers may be able to earn parking awards, such as free parking, based upon their purchase of merchandise or purchase of a service. Thus, in one embodiment, merchant or service provider transactions can be posted to the user account 530. Based upon the purchases, the system 500 can be configured to determine whether an individual has earned an award. Different groups of merchant and/or service providers can sponsor rewards programs and the award thresholds can vary from group to group.

When multiple parking reward programs are instantiated on the system 500, the rewards program application can be configured to receive event information and determine whether the event is associated with a particular rewards program, such as a rewards program sponsored by the city or a rewards program sponsored by a merchant. Then, the system 500 can calculate the calculate point values associated with the event and add them to the account 530. In one embodiment, a single event can earn points in multiple rewards programs. For instance, a purchase of parking at a particular location can earn points in a city sponsored rewards program as well as points from a merchant sponsored rewards program associated with the particular parking location. As is described in more detail with respect to FIG. 6, parking rewards programs can be based on particular zones within the city where zones for different rewards programs can overlap. Thus, where the zones overlap, points can be earned for different rewards programs.

In another embodiment, the merchants or service providers can pre-purchase parking credits or parking discounts from the city and then determine when to provide an award. As an alternate, the merchants or service providers can enter into an agreement to reimburse the city as they provide parking awards. Then, the merchants or services providers can keep track of when individuals earn parking rewards based upon their purchases separately from system 500.

A user can provide their account identifier to the merchant. Using their account identifier and via a communication with parking system 500, the merchant system (not shown) can post an awards can be posted directly to the user's account, such as 530. The system 500 can be configured to verify that the merchant posting the balance is a valid and approved merchant, handle account balances, such as deducting the award from a pre-purchased amount of parking by the merchant or if the parking used for the award hasn't been pre-purchased, posting a charge to the merchant account.

In another embodiment, the merchant or the service provider can give the user an instrument, such as a printed receipt, that includes an award identifier. The award identifier can be a unique identification number or a unique symbol, such as a bar-code, that is associated with the reward. The system 500 can be configured to generate award identification numbers, receive issued awards including the award identifiers, verify its authenticity and allow a user, such as a user associated with account 530, to redeem the award for parking credits or a parking discount associated with the award identifier. This type of award can be provided independently of whether a user has an account with the system 500. In one embodiment, the system 500 can be configured to allow a recipient of such an award to upload the award to their account for storage and later redemption. Uploaded awards and/or awards determined from the event data 536 can be stored as awards 538 in the user account 530.

In particular embodiments, the system 500 can be configured to keep track of events that occur while an account holder is utilizing a parking space, such as an event occurring after the purchase of parking. As is described in more detail below, these events can involve purchases of a service or merchandise. The service can be provided by a government or a non-government entity. As is described as follows, these events can be referred as a parking activity.

In general, a parking activity can be information about something done by an individual while they are utilizing a purchased parking space. When an individual purchases parking, a time period for which the parking is valid can be stored to the user's account, such as 530. Then, when parking activity information is received at the system, a time period associated with the parking can be compared to a time period associated with the activity. If the time period of the associated within the time period of the parking or is close to the time period when the parking purchase ends, such as within 15 minutes to ½ hour, the activity can be considered a parking activity by the system 500.

As an example of a parking activity, a user may purchase parking and then within the time period that the purchased parking is valid, the user may make a purchase at a store that participates in a parking program associated with system 500. The user can provide their account number at a point of sales terminal and the purchase time as well as details about the purchase can be sent to the system 500. The system 500 can receive the information associated with the purchase and determine that it has occurred while the user is paying for parking. Then, the system 500 can classify the purchase as a parking activity.

In another example of a parking activity, a user can find a parking space, purchase parking and then utilize another mode of transportation. The other mode of transportation, such as bus or train, can provide electronic devices that allow information about the transportation activity to be transmitted to a user's mobile device and then to their account on server 502 via their mobile device. For instance, a transmitting device that generates a time signal and information about the mode of transportation can be provided near the entrance of the bus where a passenger pays the bus fair. In FIG. 4, the transmitting device can be referred to as an activity validation source. The information from the transmitting device can be uploaded to the user account 530 and if it falls within the time period of the parking purchase can be considered a parking activity.

As an example, a transmitting device capable of generating a near field communication, such as within 4 cm, can be located. A user's mobile device can be configured to receive information transmitted via a near field communication. A user can pass their device near the transmitting device within the maximum range of the device and an activity validation code can be transmitted to the mobile device. A unique validation code can be generated for each swipe. Then, the validation code can be uploaded to the system 500, such as to server 502, via a communication between the mobile device and the system.

In an alternate embodiment, the electronic device can include a receiver configured to receive information from the mobile device, such as an account number and a mobile device identification number. The electronic device can receive the information from the mobile device and send it along with information describing the activity and a time of the activity to system 500. Again, this communication might occur using a near-field communication protocol. After validation information is uploaded, the system 500 can match the information to a user account and then determine whether it is a parking activity, i.e., it has occurred during a purchase of parking.

The parking activity may not involve a purchase. For instance, an individual can go to the library, a city's town hall or a free doctor clinic while they are using a parking space. At each of these locations, an interface can be provided that allows information to be transferred to or from a user's mobile device and to be uploaded to the system 500 via the interface or via the user's mobile device. The information can include a time at which the activity occurred, information about the activity and information that allows the activity to be matched to a user's account, such as an account identifier or a mobile device identifier. The system 500 can then determine whether the activity is a parking activity and store it to the user account 530 accordingly.

Based upon the parking activities stored in a user's account, an entity, such as a city, a merchant or a group of merchants, can incentivize with parking awards certain activities or a combination of activities that are performed while an individual is using a parking space. For instance, a city might allow points to be earned towards a parking award when individual uses city services while parked, such as going to the library or the town hall. In another example, the city might allow an individual to earn points for a parking award when a user purchases parking on the outskirts of the city where parking is more available and then subsequently takes public transportation into the core of the city. In this example, the purchase of parking can earn points and then the subsequent use of public transportation can also earn additional points. This incentive might be used to reduce congestion within the city core.

In yet another embodiment, a city might allow individuals to earn points based upon how efficiently they trips that involve the use of parking. For instance, the city can provide points for a parking award for an individual that performs two or more validated activities while they have purchased parking where the amount of the points earned can increase as the number of validate activities increases. This incentive can encourage individuals to plan their trips better and hence, better use limited parking spaces. The validated activities used to determine awards can be associated with only city services, can be combination of city and merchant services or can be just merchant services. For instance, the city might designate a certain area a shopping district to increase sales tax revenue and provide points for parking awards to individuals that utilize parking spaces within the shopping district for shopping based upon their validate shopping activities.

Another type of event that can be stored to a user account is a parking violation. The user account 530 can be connected to a parking enforcement application 540. When a user receives a parking violation, such as for violating a parking policy associated with a particular space, the user can receive a parking penalty that can be posted to the user account. The parking penalty event can affect the parking awards. As an example, in one embodiment, a user may not be eligible for certain awards unless a certain amount of time hasn't occurred since their last penalty. For instance, a good parking award can be earned if a user has purchased parking within a six month period without any parking violations. As another example, if a user has unpaid parking violations, then a user may not be eligible to earn points via the parking rewards program until the parking violations are paid off.

The parking enforcement application 540 can interact with a portable device used for parking enforcement in a bi-directional manner. First, the parking enforcement device can be configured to gather and transmit information that allows a space and the associated parking policy associated with the space to be identified. The parking enforcement application 540 can transmit the parking policy information to the parking enforcement device, which can output this information to the parking enforcer. Then, the parking enforcement device can be used to gather and transmit information associated with a vehicle occupying the space. The vehicle can be linked to a user account in the parking rewards program. Thus, allowing an account in the rewards program to be identified.

In more detail, at the site of a detected parking violation, via the parking enforcement device, a parking enforcement person can gather and enter vehicle information associated with the vehicle occupying the space. For instance, via the electronic device an image of a user's license plate can be taken and uploaded to the system 500. Using optical character recognition, the system 500 can recognize the characters associated with the vehicle license plate and then match them to a user's account. In another example, via the electronic device, the parking enforcer can enter the user's license plate. In yet another example, a transmitter or display device placed within the vehicle can transmit information that allows a user account in the rewards program to be identified. The electronic device used by the parking enforcer can receive information, such as via a wireless transmission or via manual entry by the parking enforcer. The input information can be used by the system 500 to identify a user's account, such as 530, that is associated with the vehicle.

If the system 500 identifies an account, then the system 500 can be configured to examine events, such as 536 and/or awards, such as 538, posted to the account, determine whether a ticket is warranted or not and send an indication to the electronic device carried by the enforce indicating an adjustment to the parking violation. For instance, if the individual has a good history of parking, the system 500 can award the individual a "free parking violation award." With the free parking violation award, the individual may receive a warning ticket rather than a parking violation with a fine. The system 500 can be configured to send to the electronic device associated with enforcement a message to issue only a warning ticket and deduct the "free parking violation award" from the user's account.

As another example, a user may be able to purchase parking for a certain time period but then has to move their car. The time period limitation can be part of the parking policy associated with the space. In one embodiment, the system 500 can be configured to provide a time extension award. The time extension award can allow the time period to be extended. If the user exceeds the allotted time period for a particular space as indicated by the parking policy and has previously earned this award, the system 500 can be configured to automatically apply this award and send a message to the parking enforcement device to only issue a warning ticket. The warning ticket can include information that a parking award was applied.

In yet another embodiment, a user with an account can receive a parking violation. If the user account data, such as 536, shows that the user validated an activity, such as going to the doctor, and received a ticket before returning to their car where the activity was validated within some time period after the parking was purchased the system 500 can be configured to give the user a reduced fine up to no fine depending on the type of activity that was validated. In this example, the system 500 can be configured to send a message to the user, such as to an e-mail address registered with the system 500 by the user, indicating that the amount of the violation has been reduced. Information indicating the fine has been reduced can be stored to the user's account.

Next, additional of the parking system 500 and its components are described including user interactions with the system. The parking system 500 can be used to monitor parking utilization in locations, such as on city streets as well as within parking structures that can be controlled by the city. As an example, in FIG. 5, four parking spaces, 504*a*, 504*b*, 504*c* and 504*d*, on a city street are shown occupied by a three cars 508*a*, 508*b* and 508*c*, respectively. One or more mechanisms for purchasing and/or monitoring parking at each of the spaces can be provided. For instance, as was described above with respect to FIGS. 1-4, kiosks or meters can be used to purchase parking and sensors can be used to determine if parking spaces are occupied. Mechanisms 506*a*, 506*b*, 506*c* and 506*d* can include the sensors and/or a purchasing mechanism.

A parking space can be purchased by an individual, such as 514. In one embodiment, the parking system 500 can allow for communications with the system, such as server 502, via a mobile device, such as 512, carried by the user. Parking policy enforcement can be handled by an individual, such as 516. An individual enforcing parking policy can also interact with the system 500 via a mobile device, such as 518. As described above, the mobile device carried by the individual 518 enforcing the parking policy can gather information that can be associated with a user account. Based upon account data in a user's account, such as a previously earned parking award, an outcome to a parking violation can be modified.

The server 502 can be configured to communicate with devices, such as mobile devices 512 and 518, via a network interface coupled to a data network. The remote server 500 can be configured to communicate with user controlled devices, such as home computers, laptops and mobile devices (e.g., 512), and operator controlled devices, such as terminals for configuring the server 502 and mobile devices (e.g., 518) associated with parking enforcement. Further, the server 502 can also be configured to communicate with the validation sources 520 and 522 directly or receive information generated from one of the validation sources indirectly, such as via an upload from a user's mobile device, such as 512.

As described above, the validation sources, such as 520 and 522, can be configured to transmit activity information including a particular time or time period that a particular activity has occurred and some information that identifies the activity. These validation sources can be registered with the system 500 so that the system 500 can be configured to recognize activity information only from registered sources. In some embodiments, the validation sources, such as 520 and 522, can be configured to generate validation information that allows the server 500 to determine that an activity validation source is authentic.

The user 514 can purchase parking in space 504*b* for their vehicle 508*a* The user 514 may have previously registered for an account allowing for parking rewards, such as 530. Via the user's mobile device 512 or one of the mechanisms for monitoring and/or purchasing parking, such as 506*b*, the parking purchase information can be uploaded to server 502 and stored to the user 514's account. The parking purchase information from the current purchase alone or the current purchase combined with other events stored to the account can be processed by rewards program logic, such as 546, to determine whether the current purchase has triggered an award. As described above, purchases of parking can earn points where different point value thresholds can be associated with different awards. The award can be a credit for free or discounted parking. Also, the award can be something that affects the enforcement of parking policy. For instance, as described above, one award might allow a user to receive a warning ticket instead of an actual ticket when a parking violation has occurred.

After leaving their vehicle, the user 514 can perform different activities while their purchase of parking is active. The system 500 can be configured to allow some of these activities to be validated. The operator of the rewards program, such as city, can register entities and associated electronic devices that can be used to validate the activities. In one embodiment, a software application can be installed on a registered entity device. The software application can be configured to request a unique number from system 500 each time an activity is validated. This unique number can be stored to a user's account in system 500 to provide an audit trail that leads to the device that validated the activity.

Whether an activity has occurred while a user has purchased parking or not can be determined by the system 500 and can provide a basis for determining awards. For instance, certain merchant providers may only wish a user to earn points for parking awards for activities that have occurred while the user, such as 514, has purchased parking. In another example, the user 514 can validate activities at validation source 520 and 522 during their parking purchase and a city can provide points redeemable for an award to the user 514 for good trip planning. In other embodiments, the validation of an activity can affect enforcement of a parking policy. For instance, some activities validated around the time a parking violation has occurred can result in a reduced penalty for the violation. For instance, a user that received a parking violation while visiting a doctor where the doctor visit was validated can receive a reduced penalty.

The individual 516 carrying mobile device 518 can provide parking enforcement. The individual 516 can walk up the street or drive in a vehicle and receive status information on each of the spaces. The individual may determine that a violation has occurred at space 504b where vehicle 508a is parked. The individual can then enter and/or gather via their mobile device 518 vehicle identifying information, such as a license plate number. As another example, a device inside the vehicle can display and/or transmit information associated with the vehicle or vehicle owner.

The information received by the mobile device 518 can be uploaded to server 502. Based upon the information, the server 502 can identify a user account, such as the account associated with user 514. Then, information related to the parking violation can be stored to the user account. Based upon account activity in the user's account, such as previously earned awards, the parking violation can be modified. For instance, the user 514 can receive a parking warning ticket instead of a parking violation with an associated penalty.

The parking rewards program described above with respect to FIG. 5 can also be affected by location information. When parking purchases are made and activity information is validated location information can be included. In one embodiment, the location information can be generated from a GPS receiver located on the user's mobile device. In another embodiment, the location information can be based upon a known location of a parking space or an activity validation source. The location information can be used to affect a rewards program implemented by a parking system, such as system 500 described above with respect to FIG. 5. A few embodiments of the use of location based information in a parking rewards program are described as follows with respect to FIG. 6.

Figure 6:
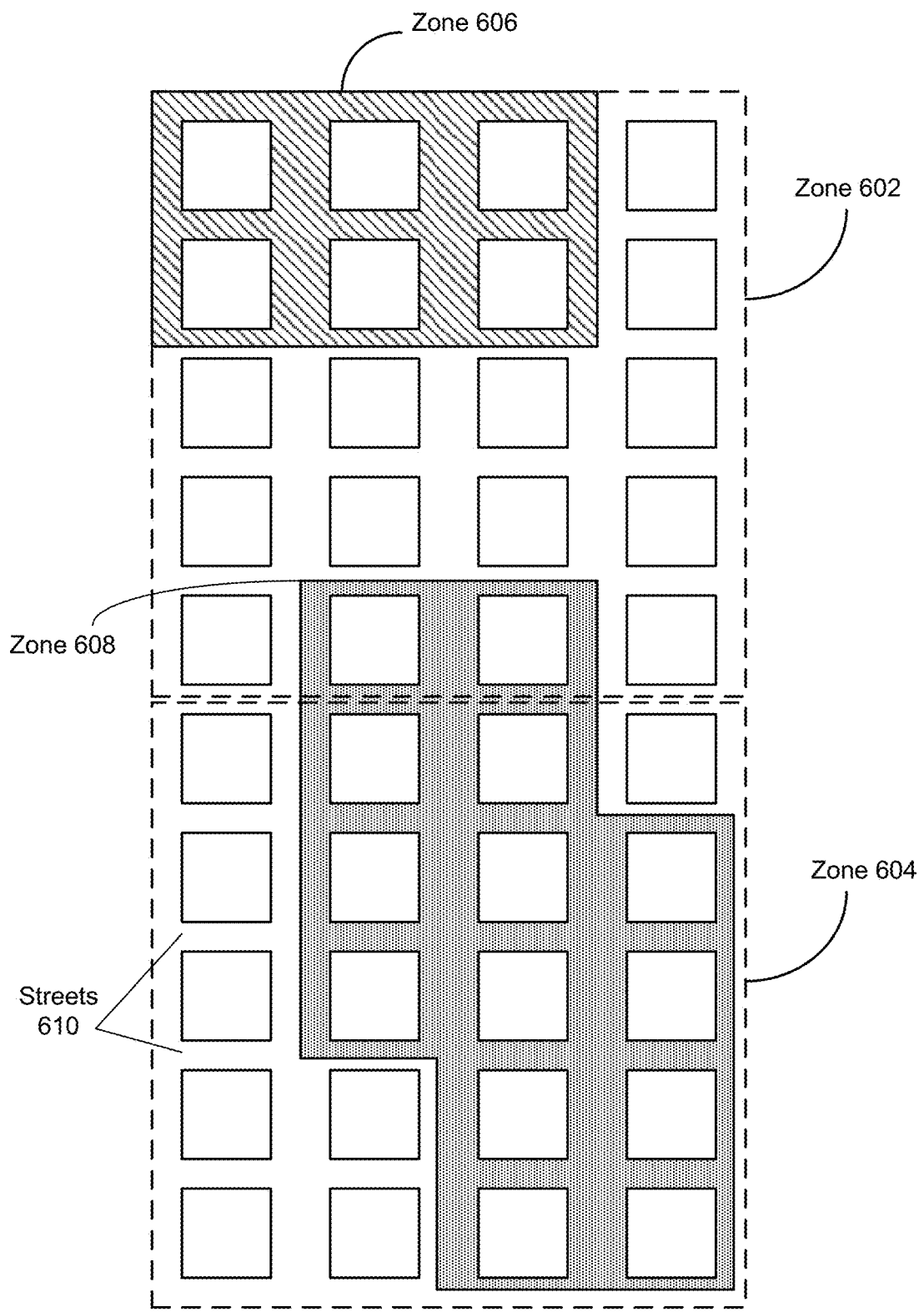
FIG. 6 shows a block diagram of a zones used in parking system that allows individual parking behaviors to be tracked and incentivized based upon location.

FIG. 6 shows a block diagram of a zones used in parking system that allows individual parking behaviors to be tracked and incentivized based upon location. A city can with streets 610 can be divided into different zones. In FIG. 6, zones 602, 604, 606 and 608 are shown. In the various embodiments, two zones, such as zones 604 and 606 can be adjacent to one another without overlapping. In another embodiment, a first zone can be solely contained within a second zone. For instance, zone 606 is located within zone 602. In yet another embodiment, a zone can overlap other zones. For instance, zone 608 overlaps zone 602 and zone 604.

In various embodiments, awards in a rewards program can be based upon purchases of parking, purchases of services and merchandise and/or validated activities that occur within a particular zone. For instances, a merchant located in zone 606 may wish to provide awards based upon a purchase of parking in zone 606 and then a subsequent purchase of merchandise at the merchant. In another example, two merchants located in zone 604 may combine their rewards program into a single rewards program such that awards are extended to individuals that park only in zone 604.

In yet other embodiments, parking awards can be zone dependent. For instance, a parking award, such as a credit or a discount, can be valid for only parking in a parking in a particular zone, such as zone 602 or zone 604. The award location can be independent of the zones where the points used to earn an award were generated. For instance, a user can purchase parking and earn points in zone 602 and 604 and then earn a parking award that is valid only in zone 604.

A city might not provide parking awards in particular zones to discourage parking in the zone and relieve congestion. Further, the city can provide awards or promotions in a first zone to relieve congestion in a nearby second zone. In some embodiments, the location of a particular space can affect the rate at which an award is earned. For instance, parking purchase in a first zone can earn more points than a parking purchase in a second zone of the same amount. Thus, in general, points that allow awards to be earned can be generated for each parking purchase where the points earned for a similar parking purchase amount can vary from zone to zone.

In one embodiment, the weights, such as points earned for a parking purchase can be adjusted on a real-time basis and broadcast to potential parkers to encourage parking in one zone over another zone. For instance, if zone 604 was particular congested, the parking system 500 can generate an incentive, such as the ability to earn additional award points on a parking purchase if they parked in zone 602. Further, if desired, the system 500 could also reduce or eliminate the award points that were generated for parking in zone 604 when it is congested.

The award point adjustments can be adjusted in real-time based upon local conditions within a zone. For instance, the adjustments can be based upon a monitoring of real-time traffic conditions, using traffic cameras within the zone. As another example, the adjustments can be based upon the utilization of parking spaces within a particular zone, which can be determined by the parking system. As described above, the system 500 can be configured to output to a display the availability of parking spaces. In addition, the system 500 can be configured to output the availability of promotions, such as an ability to earn additional points for parking in one zone versus another zone.

In another example, the zone where the parking is purchased can be tied the location where an award is earned. For instance, activities occurring in zone 602 can result in parking awards that are valid only in zone 602. In other embodiments, earning rates for parking awards can vary depending on whether is a resident of a particular zone or not. For instance, the earning rates for awards for parking purchases within a user's zone of residence can be different than the earning rates for parking purchases made by the user outside of their zone. Thus, in one embodiment, the parking system can be configured to determine a zone where an activity has occurred and compare it to the zone associated with an address of an account holder in determining points earned for a particular transaction.

The rewards program described above is not limited to purchases of parking and rewards of parking. In general, in a rewards program, such as rewards program associated with a city, any purchase of city services can be a basis for earning award points. For example, award points can be earned for purchases of city transportation services, such as bus, ferry, bike sharing, car sharing and train. The award points from different types of purchases can be combined to earn various awards, such as a free or a discounted city service.

Further, a rewards program can involve earning awards points for a purchase of city services and non-governmental services, such as those provided by city merchants. For example, a city can partner with merchants to provide an awards program. Again, the awards points for the different types of purchases can be combined and used to receive free or discounted city services or non-governmental surfaces.

Like the parking awards, the rewards program can be used to encourage certain participant behaviors related to city provided services, such as the use of public transportation. The rewards can vary from location to location depending on particular objectives for behavior modification with a particular area. For instance, within certain, award points that are earned for a particular activity, such as the use of public transportation, can be greater in a first area than a second area. Further award points that are earned can be time varying to account for changing conditions within an area, such as increases or decreases in automobile congestion within a particular area.

The various aspects, embodiments, implementations or features of the invention can be used separately or in any combination. The invention can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage is reducing infrastructure costs. Methods and apparatus for providing city services, such as parking services, are described that leverage portable devices, such as cell phones and their associated network infrastructure. The described apparatus and methods may improve access and efficient utilization of city services without requiring maintenance of a large network infrastructure. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

The invention claimed is:

1. A method in server including a processor; a memory and a network communication interface comprising:
   receiving, via the network communication interface, parking sensor information from a plurality of parking sensors;
   sending, via the network communication interface, locations of available parking to mobile devices including a first mobile device;
   receiving, via the network communication interface, first parking transaction information associated with a purchase of parking for a first time period and a unique identifier associated with the first mobile device;
   receiving, via the network communication interface; a first unique activity code and validation information wherein the first unique activity code and the validation information is generated from a first electronic device configured to wirelessly communicate, over a short distance, unique activity codes and the validation information to mobile devices including the first unique activity code to the first mobile device wherein the short distance is within a maximum range of communication of 4 centimeters;
   based upon the unique identifier associated with the first mobile device, identifying a first user account from among a plurality of user accounts;
   based upon the first unique activity code, determining whether a parking activity occurred during the time period;
   based upon the validation information, determining whether the first electronic device is authentic; and
   when it is determined the parking activity occurred during the time period and the first electronic device is authentic, determining a parking reward associated with the first user account.

2. The method of claim 1, wherein each parking sensor includes a sensor configured to detect a presence of a vehicle in an area proximate to the sensor, a power supply and a first communication interface configured to communicate parking sensor information associated with the presence of the vehicle, and wherein the method further comprises:
   based upon the parking sensor information, determining locations of available parking.

3. The method of claim 2, wherein a portion of the parking sensor information is received from a parking base station, the parking base station including a first processor, a first memory, a power supply, a second communication interface configured to receive the parking sensor information from the plurality of parking sensors, a wireless communication interface configured to communicate wirelessly with nearby mobile devices including receiving parking transaction information from the nearby mobile devices, a third communication interface to communicate the parking transaction information and the portion of the parking sensor information to the server.

4. The method of claim 1, wherein the first electronic device is configured to communicate with the mobile devices using a near-field communication protocol.

5. The method of claim 1, further comprising receiving a time signal and based upon the time signal determining whether the parking activity occurred during the time period.

6. The method of claim 5, wherein the first electronic device is further configured to generate the time signal which is wirelessly communicated to the first mobile device when the first mobile device is within the maximum range of communication of 4 centimeters.

7. The method of claim 1, further comprising receiving from the first electronic device the unique identifier associated with the first mobile device.

8. The method of claim 1, further comprising receiving from the first electronic device the first unique activity code.

9. The method of claim 1, further comprising receiving from the first electronic device information describing an activity associated with the first unique activity code.

10. The method of claim 1, further comprising receiving, via the first mobile device, first parking sensor information from a first parking sensor from among a plurality of parking sensors.

11. The method of claim 1, further comprising receiving location information from the first mobile device and based upon the location information, determining a parking award.

12. The method of claim 11, wherein the location information is determined from a GPS sensor located on the first mobile device.

13. The method of claim 11, wherein the location information is based upon a known location of the first electronic device.

14. The method of claim 1, further comprising determining a plurality of parking activities occur during the time period.

15. The method of claim 14, based upon the plurality of parking activities, determining a first parking award.

16. The method of claim 15, wherein a value of the first parking award increases as a number of the plurality of parking activities increases.

17. The method of claim 1, wherein the first electronic device is located on a bus or a train and wherein the parking activity is associated with taking a bus ride or a train ride during the time period.

18. The method of claim 1, wherein the first electronic device is located proximate to a location where a government service is provided and wherein the parking activity is associated with utilizing the government service during the time period.

19. A method in server including a processor, a memory and a network communication interface comprising:
- receiving, via the network communication interface; parking sensor information from a plurality of parking sensors;
- sending, via the network communication interface, locations of available parking to mobile devices including a first mobile device;
- receiving, via the network communication interface, first parking transaction information associated with a purchase of parking for a first time period and a unique identifier associated with the first mobile device;
- receiving, via the network communication interface from a first electronic device, a first unique activity code, validation information and the unique identifier associated with the first mobile device wherein the first electronic device is configured to i) generate the first unique activity code and the validation information; ii) wirelessly communicate, over a short distance, unique activity codes and the validation information to mobile devices including the first unique activity code to the first mobile device and iii) receive, wirelessly, over the short distance, the unique identifier associated the first mobile device wherein the short distance is within a maximum range of communication of 4 centimeters;
- based upon the unique identifier associated with the first mobile device, identifying a first user account from among a plurality of user accounts;
- based upon the first unique activity code, determining whether a parking activity occurred during the time period;
- based upon the validation information; determining whether the first electronic device is authentic; and
- when it is determined the parking activity occurred during the time period and the first electronic device is authentic, determining a parking reward associated with the first user account.

20. The method of claim 19, wherein each parking sensor includes a sensor configured to detect a presence of a vehicle in an area proximate to the sensor, a power supply and a first communication interface configured to communicate parking sensor information associated with the presence of the vehicle; and wherein the method further comprises:
- based upon the parking sensor information, determining locations of available parking.

21. The method of claim 20, wherein a portion of the parking sensor information is received from a parking base station, the parking base station including a first processor, a first memory, a power supply, a second communication interface configured to receive the parking sensor information from the plurality of parking sensors, a wireless communication interface configured to communicate wirelessly with nearby mobile devices including receiving parking transaction information from the nearby mobile devices, a third communication interface to communicate the parking transaction information and the portion of the parking sensor information to the server.

* * * * *